United States Patent
Kato et al.

(10) Patent No.: US 8,013,910 B2
(45) Date of Patent: Sep. 6, 2011

(54) IMAGING APPARATUS, IMAGING CIRCUIT AND IMAGING METHOD

(75) Inventors: Fumiaki Kato, Chiba (JP); Ken Nakajima, Tokyo (JP)

(73) Assignee: Sony Corporation, Tokyo (JP)

(*) Notice: Subject to any disclaimer, the term of this patent is extended or adjusted under 35 U.S.C. 154(b) by 773 days.

(21) Appl. No.: 12/123,340

(22) Filed: May 19, 2008

(65) Prior Publication Data

US 2008/0291295 A1    Nov. 27, 2008

(30) Foreign Application Priority Data

May 24, 2007    (JP) ................. 2007-137387

(51) Int. Cl.
| H04N 5/235 | (2006.01) |
| H04N 5/76 | (2006.01) |
| G06K 9/00 | (2006.01) |
| G06K 9/40 | (2006.01) |
| G06K 9/46 | (2006.01) |
| G06K 9/56 | (2006.01) |

(52) U.S. Cl. .............. 348/229.1; 348/231.99; 382/251; 382/254; 382/232; 382/308

(58) Field of Classification Search .............. 348/229.1, 348/231.99; 382/232, 251, 254, 308
See application file for complete search history.

(56) References Cited

U.S. PATENT DOCUMENTS

| 5,583,573 | A  * | 12/1996 | Asamura et al. | ......... 375/240.04 |
| 7,072,511 | B2 * | 7/2006  | Tan et al.     | ............... 382/167 |
| 7,092,965 | B2 * | 8/2006  | Easwar         | ..................... 1/1 |
| 7,382,941 | B2 * | 6/2008  | Hwang          | ............ 382/308 |
| 2003/0194128 | A1 * | 10/2003 | Tan et al.   | ............ 382/167 |

FOREIGN PATENT DOCUMENTS

| JP | 5-191770   | 7/1993 |
| JP | 2003-125209 | 4/2003 |
| JP | 2004-40300 | 2/2004 |

* cited by examiner

*Primary Examiner* — David Ometz
*Assistant Examiner* — Quang Le
(74) *Attorney, Agent, or Firm* — K&L Gates LLP

(57) ABSTRACT

An image by using a solid-state imaging sensor, the imaging apparatus including: a compression section configured to compress image data by dividing the image data into blocks each composed of same color component pixels adjacent to each other as a unit of compression; a memory used for temporarily storing compressed image data; a decompression section configured to decompress the compressed image data read out from the memory; and a signal processing section configured to carry out an image-quality correction process on decompressed image data, wherein each of the blocks is split in advance into two quantization-subject areas, block types are distinguished from each other by the position of the inter-area boundary between the two quantization-subject areas, and the compression section has a dynamic-range computation sub-section, a block-type select sub-section, and a quantization processing sub-section are provided.

17 Claims, 12 Drawing Sheets

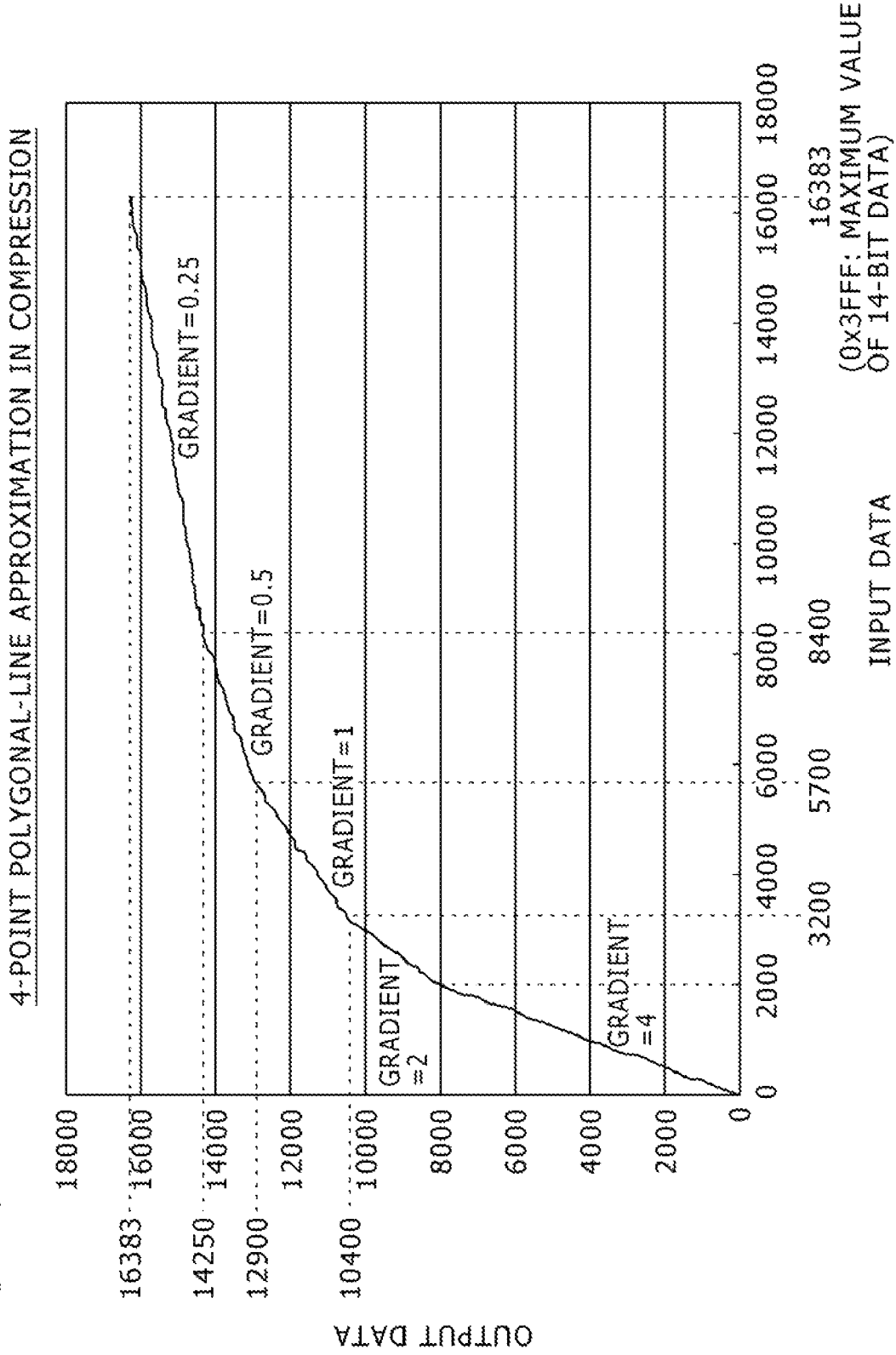

FIG. 6

12PIXEL(6PIXEL×2LINE),64BIT

| | TYPE IDENTIFI-CATION CODE | MINIMUM | SHIFT QUANTITY | QUANTIZED DATA | | |
|---|---|---|---|---|---|---|
| TYPE 1 | 00 (2BIT) | (FOR AREA A1) 10BIT | (FOR AREA A1) 3BIT | (FOR AREA A1) 4BIT×12=48BIT | | EMPTY 1BIT |
| TYPE 2 | 01 (2BIT) | (FOR AREA A2) 10BIT | (FOR AREA A2) 3BIT | (FOR AREA A2) 3BIT×4=12BIT | MINIMUM (FOR AREA B2) 10BIT / SHIFT QUANTITY (FOR AREA B2) 3BIT | QUANTIZED DATA (FOR AREA B2) 3BIT×8=24BIT |
| TYPE 3 | 10 (2BIT) | (FOR AREA A3) 10BIT | (FOR AREA A3) 3BIT | (FOR AREA A3) 3BIT×8=24BIT | MINIMUM (FOR AREA B3) 10BIT / SHIFT QUANTITY (FOR AREA B3) 3BIT | QUANTIZED DATA (FOR AREA B3) 3BIT×4=12BIT |
| TYPE 4 | 11 (2BIT) | (FOR AREA A4) 10BIT | (FOR AREA A4) 3BIT | (FOR AREA A4) 3BIT×6=18BIT | MINIMUM (FOR AREA B4) 10BIT / SHIFT QUANTITY (FOR AREA B4) 3BIT | QUANTIZED DATA (FOR AREA B4) 3BIT×6=18BIT | ns
IMAGING APPARATUS, IMAGING CIRCUIT AND IMAGING METHOD

CROSS REFERENCES TO RELATED APPLICATIONS

The present application claims priority to Japanese Patent Application. JP 2007-137387 filed in the Japan Patent Office on May 24, 2007, the entire contents of which being incorporated herein by reference.

BACKGROUND

The present application relates to an imaging apparatus for taking an image by making use of a solid-state imaging sensor, an imaging circuit employed in the imaging apparatus and an imaging method adopted by the imaging apparatus. More particularly, the present application relates to an imaging apparatus having a configuration for temporarily storing an image signal obtained from an imaging operation in a memory and processing the image signal stored in the memory, relates to an imaging circuit suitable for the configuration and relates to an imaging method adopted by the imaging apparatus.

In recent years, an imaging apparatus capable of taking an image by making use of a solid-state imaging sensor and storing the image in a memory as digital data has been becoming very popular. Examples of such an imaging apparatus are a digital still camera and a digital video camera. For such an imaging apparatus, progress is being made with regard to efforts to increase the number of pixels in the solid-state imaging sensor, raise the number of functions of the apparatus and enhance the performance of the apparatus. In particular, as the number of pixels in the solid-state imaging sensor is increased, the load of processing the image signal generated as a result of an imaging process becomes heavier. However, even such an imaging apparatus is desired to be capable of processing the image signal at a high speed so as to cause no stress developed in the user.

FIG. 12 is a block diagram showing a typical configuration of the imaging apparatus in related art. The imaging apparatus shown in FIG. 12 employs an imaging sensor 81, an AFE (analog front end) circuit 82, a digital image processing circuit 83, an SDRAM (synchronous dynamic random access memory) 84, a ROM (read only memory) 85 and a storage device 86. The digital image processing circuit 83 has a camera-signal pre-processing section 91, a camera-signal processing section 92, a resolution conversion section 93, a JPEG (Joint photographic experts group) engine 94, a CPU (central processing unit) 95, a video output encoder 96 and an SDRAM controller 97. The camera-signal pre-processing section 91, the camera-signal processing section 92, the resolution conversion section 93, the JPEG engine 94, the CPU 95, the video output encoder 96 and the SDRAM controller 97 are connected to each other by an internal bus 98.

In such an imaging apparatus, image signals generated by the imaging sensor 81 as a result of an imaging operation are sequentially supplied to the AFE circuit 82 for earning processing such as a CDS (correlated double sampling) process and an AGC (automatic gain control) process on the signals before converting the image signals into a digital signal to be supplied to the digital image processing circuit 83. In the digital image processing circuit 83, the camera-signal pre-processing section 91 carries out processing such as a defective-pixel correction process and a shading process on the digital image signal received from the AFE circuit 82 and supplies the result of the processing to the SDRAM 84 by way of the SDRAM controller 97 as raw image data.

The camera-signal processing section 92 reads out the raw image data from the SDRAM 84 through the SDRAM controller 97, earning out a variety of detection processes and an image quality correction process (or a camera-signal process) on the raw image data. Subsequently, the camera-signal processing section 92 converts the result of the processes into a luminance signal Y and color-difference signals R-Y and B-Y, outputting the luminance signal Y and color-difference signals R-Y and B-Y. The resolution conversion section 93 carries out resolution conversion processing on the image data output by the camera-signal processing section 92 in order to produce image data having a resolution proper for a display if necessary.

The video output encoder 96 converts the image data produced by the resolution conversion section 93 as image data having a resolution proper for a display into an image signal to be displayed on a monitor. Then, the video output encoder 96 outputs tire image signal to the monitor not shown in the figure or a video output terminal 96a. In this way, a camera-through image can be displayed. The JPEG engine 94 carries out a compression/encoding process according to a JPEG method on the image data generated by the camera-signal processing section 92 or the resolution conversion section 93 and temporarily stores JPEG-encoded data obtained as a result of the process in the SDRAM 84. The CPU 95 transfers the JPEG-encoded data from the SDRAM 84 to the storage device 86 used for recording the data.

It is to be noted that the CPU 95 executes overall control of the entire processing carried out by the imaging apparatus. The ROM 85 is a memory used for storing programs to be executed by the CPU 95 and data necessary in the execution of the programs.

In addition, in the typical configuration described above, a taken image is recorded in the storage device 86 as JPEG data. As an alternative, however, it is possible to implement an imaging apparatus having a function to record raw image data not subjected to processing including the camera-signal process into the storage device 86 as it is. For example, an imaging apparatus described in documents such as Japanese Patent Laid-open No. 2004-40300 (herein after referred to as patent document 1) has a function to compress raw image data by adoption of a reversible compression technique making use of a Huffman table and record compressed image data obtained as a result of the compression. In this imaging apparatus, the Huffman, table is optimized for every color channel. In an imaging apparatus described in documents such as Japanese Patent Laid-open No. 2003-125209 (hereinafter referred to as patent document 2), in a raw-data compression mode for compressing raw image data and recording compressed image data obtained as a result of the compression, an interpolation processing section configured to interpolate the raw image data in a normal compression mode is bypassed.

In addition, in a relevant imaging apparatus described in documents such as Japanese Patent Laid-open No. Hei 5-191770 (hereinafter referred to as patent document 3), image data acquired from an imaging sensor is subjected to a reversible compression process and compressed image data obtained as a result of the process is stored temporarily in a memory. Then, the compressed image data is subjected to a decompression process and signal processing prior to an irreversible compression process, the result of which is again stored in a memory.

SUMMARY

By the way, as shown in FIG. 12 described above, an ordinary imaging apparatus has a configuration in which raw image data acquired from an imaging sensor is stored in an image memory such as an SDRAM and then read out from the image memory to be subjected to processing such as a camera-signal process. The imaging apparatus may have a type of completing the capture of one frame in a plurality of fields. An example of the imaging apparatus having this type is an imaging apparatus employing an imaging sensor adopting an interlace read method. In the case of such an imaging apparatus, after data of every field is stored in a memory, it is necessary to reproduce data of one frame. In addition, in order to suppress the size of a line memory employed in a camera-signal processing section, it is necessary to provide a processing system for partially processing the entire screen by making use of only a delay line of about a fraction of the length of 1H (that is, the length of the horizontal synchronization period). The entire screen is processed partially by for example dividing the screen into some strips in the vertical direction. Even in the case of a configuration providing such a processing system, it is necessary to store the data of the entire screen in a memory at least prior to the processing.

In an operation to write raw image data into a memory and an operation to read out raw image data from the memory, the data of the entire screen is transferred through an internal bus. Thus, a bus band necessary for transfers of the data occupies most of the entire band in the imaging process. In particular, the larger the amount of raw image data due to a larger number of pixels employed in the imaging sensor, the heavier the load of the data transfer and, hence, the longer the time it takes to carry out the operation to write raw image data into a memory and the operation to read out raw image data from the memory. Thus, if an attempt is made to shorten the time it takes to carry out a recording operation, it is necessary to typically increase the frequency of image-data transfers along the internal bus 98, hence, widening the bus band of the internal bus 98. However, the increased frequency of image-data transfers along the internal bus 98 raises a problem of a raised cost of the imaging apparatus. In addition, the larger number of pixels employed in the imaging sensor, the larger the storage capacity of a memory used for storing the raw image data, and a large storage capacity of such a memory gives rise to another problem.

Thus, a method of compressing raw image data before transferring the data through the internal bus is a conceivable technique. If a variable-length coding method is adopted as a method for compressing the raw image data, however, the width of the required bus band cannot be made fixed during the transfer of the raw image data, making the processing complicated. There is also raised a problem that the effect of the reduction of the bus bandwidth cannot always be obtained.

In addition, as a technique for compressing raw image data, there is also a conceivable method wherein tire data is quantized by taking a block composed of a fixed number of pixels adjacent to each other as a unit of compression in order to generate a compressed-data quantum having a fixed length. If the raw image data is quantized by always taking a block composed of a fixed number of pixels adjacent to each other as a unit of compression in accordance with this technique, however, there is raised a problem that, as the number of quantization bits is reduced, the number of noises is increased inevitably and, at a portion such as an edge at which brightness variations are severe in particular, it is quite within the bounds of possibility that noises are generated to such a degree that tire noises can no longer be ignored.

It is to be noted that the imaging apparatus disclosed in patent document 1 described earlier is an apparatus for compressing raw image data by adoption of the variable-length coding method. In addition, both the imaging apparatuses disclosed in patent documents 1 and 2 are not apparatuses each compressing raw image data in order to reduce the bandwidth of the internal bus. On top of that, with regard to the reversible compression technique producing compressed image data which is then stored temporarily in a memory, patent document 3 merely describes a Huffman coding process of computing differences between data of adjacent pixels. In the following description, the data of a pixel and the data of pixels are also referred to simply as pixel data.

Addressing the problems described above, inventors of the present application have innovated an imaging apparatus capable of producing an image having a high quality in an imaging operation at a high speed which can be achieved by shortening the time it takes to store image data in an internal memory and innovated an imaging circuit to be employed in the imaging apparatus and an imaging method to be adopted in the imaging apparatus.

In order to solve the problems described above, an embodiment provides an imaging apparatus for taking an image by making use of a solid-state imaging sensor. The imaging apparatus employs: a compression section configured to compress image data, which is generated by the solid-state imaging sensor as a result of an imaging process, by dividing the image data into blocks each composed of a fixed number of same color component pixels adjacent to each other and taking each of the blocks as a unit of compression; a memory used for temporarily storing compressed image data produced by the compression section; a decompression section configured to decompress compressed image data read out from the memory; and a signal processing section configured to carry out an image-quality correction process on decompressed image data produced by the decompression section.

In the imaging apparatus described above, each of the blocks is split in advance into two quantization-subject areas each composed of one or more pixels adjacent to each other and a plurality of block types are defined in advance for each of the blocks. In addition, the block types defined for any individual one of the blocks are distinguished from each other by the position of the inter-area boundary between the two quantization-subject areas in the individual block whereas the compression section has: a dynamic-range computation sub-section configured to compute a dynamic range of pixel data of pixels in each of the quantization-subject areas for each of the quantization-subject areas in each of the blocks; a block-type select sub-section configured to compute a sum of aforementioned dynamic ranges, which are each computed by the dynamic-range computation sub-section for one of the quantization-subject areas in any individual one of the blocks, for each of the block types defined for the individual block on the assumption that each of the block types has been selected for the individual block and select the block type having a smallest sum of aforementioned dynamic ranges among the block types defined for the individual block as a proper block type for the individual block; and a quantization processing sub-section configured to quantize a difference, which is obtained as a result of subtracting the smallest pixel data among pixels in any individual one of the quantization-subject areas from the pixel data of each of the pixels in the individual quantization-subject area, in accordance with the dynamic range, which is computed by the dynamic-range computation sub-section for the individual quantization-subject area, for every pixel in the quantization-subject areas which are included in any individual one of the blocks as quantization-subject areas having an inter-area boundary conforming to the proper block type selected by the block-type select sub-section for the individual block.

As described above, in the imaging apparatus for taking an image by making use of a solid-state imaging sensor: the compression section compresses image data, which is generated by the solid-state imaging sensor as a result of an imaging process, by dividing the image data into blocks each composed of a fixed number of same color component pixels adjacent to each other and taking each of the blocks as a unit of compression; then the memory is used for temporarily storing compressed image data produced by the compression section; men the decompression section decompresses compressed image data read out from the memory; and then the signal processing section carries out an image-quality correction process on decompressed image data produced by the decompression section.

In the imaging apparatus described above, each of the blocks is split in advance into two quantization-subject areas each composed of one or more pixels adjacent to each other and a plurality of block types are defined in advance for each of the blocks. In addition, the block types defined for any individual one of the blocks are distinguished from each other by the position of the inter-area boundary between the two quantization-subject areas in the individual block and, in the compression section: the dynamic-range computation sub-section computes a dynamic range of pixel data of pixels in each of the quantization-subject areas for each of the quantization-subject areas in each of the blocks; then the block-type select sub-section computes a sum of aforementioned dynamic ranges, which are each computed by the dynamic-range computation sub-section for one of the quantization-subject areas in any individual one of the blocks, for each of the block types defined for the individual block on the assumption that each of the block types has been selected for the individual block and selects the block type having a smallest sum of aforementioned dynamic ranges among the block types defined for the individual block as a proper block type for the individual block; and then the quantization processing sub-section quantizes a difference, which is obtained as a result of subtracting tire smallest pixel data among pixels in any individual one of the quantization-subject areas from the pixel data of each of the pixels in the individual quantization-subject area, in accordance with the dynamic range, which is computed by the dynamic-range computation sub-section for the individual quantization-subject area, for every pixel in the quantization-subject areas which are included in any individual one of the blocks as quantization-subject areas having an inter-area boundary conforming to the proper block type selected by the block-type select sub-section for the individual block.

In the procedure executed by the imaging apparatus as a procedure ending with a quality correction process carried out by the signal processing section on image data obtained as a result of an imaging operation, the image data is compressed before being temporarily stored in the memory. Thus, it is possible to shorten the time it takes to store the compressed image data in the memory.

To put it concretely, as described above, in the imaging apparatus for taking an image by making use of a solid-state imaging sensor: the compression section compresses image data, which is generated by the solid-state imaging sensor as a result of an imaging process, by dividing the image data into blocks each composed of a fixed number of same color component pixels adjacent to each other and taking each of the blocks as a unit of compression; then the memory is used for temporarily storing compressed image data produced by the compression section; then the decompression section decompresses compressed image data read out from the memory; and then the signal processing section carries out an image-quality correction process on decompressed image data produced by the decompression section.

In the imaging apparatus described above, each of the blocks is split in advance into two quantization-subject areas each composed of one or more pixels adjacent to each other and a plurality of block types are defined in advance for each of the blocks. In addition, the block types defined for any individual one of the blocks are distinguished from each other by the position of the inter-area boundary between the two quantization-subject areas in the individual block and, in the compression section: the dynamic-range computation sub-section computes a dynamic range of pixel data of pixels in each of the quantization-subject areas for each of the quantization-subject areas in each of the blocks; then the block-type select sub-section computes a sum of aforementioned dynamic ranges, which are each computed by tire dynamic-range computation sub-section for one of the quantization-subject areas in any individual one of the blocks, for each of the block types defined for the individual block on the assumption that each of the block types has been selected for the individual block and selects the block type having a smallest sum of aforementioned dynamic ranges among the block types defined for the individual block as a proper block type for the individual block; and then the quantization processing sub-section quantizes a difference, which is obtained as a result of subtracting the smallest pixel data among pixels in any individual one of the quantization-subject areas from the pixel data of each of the pixels in the individual quantization-subject area, in accordance with the dynamic range, which is computed by the dynamic-range computation sub-section for the individual quantization-subject area, for even pixel in the quantization-subject areas which are included in any individual one of the blocks as quantization-subject areas having an inter-area boundary conforming to the proper block type selected by the block-type select sub-section for the individual block.

Thus, a block type most optimum for suppressing deteriorations caused by quantization as deteriorations of the quality of the image to a minimum is selected for each individual one of the blocks in accordance with the image state in the individual block and, then, a quantization process is carried out for even pixel in the quantization-subject areas which are included in any individual one of the blocks as quantization-subject areas having an inter-area boundary conforming to the most optimum block type selected for the individual block. As a result, the image data can be processed at a high speed in order to generate an image having a high quality as a result of an imaging operation.

Additional features and advantages are described herein, and will be apparent from the following Detailed Description and the figures.

BRIEF DESCRIPTION OF THE FIGURES

FIG. 5 is a diagram showing a typical polygonal line used in a polygonal-line conversion/compression block;

FIG. 6 is a diagram showing structures of compressed image data generated in a packing process;

DETAILED DESCRIPTION

Embodiments are explained in detail below with reference to the figures as follows.

First Embodiment

Figure 1:
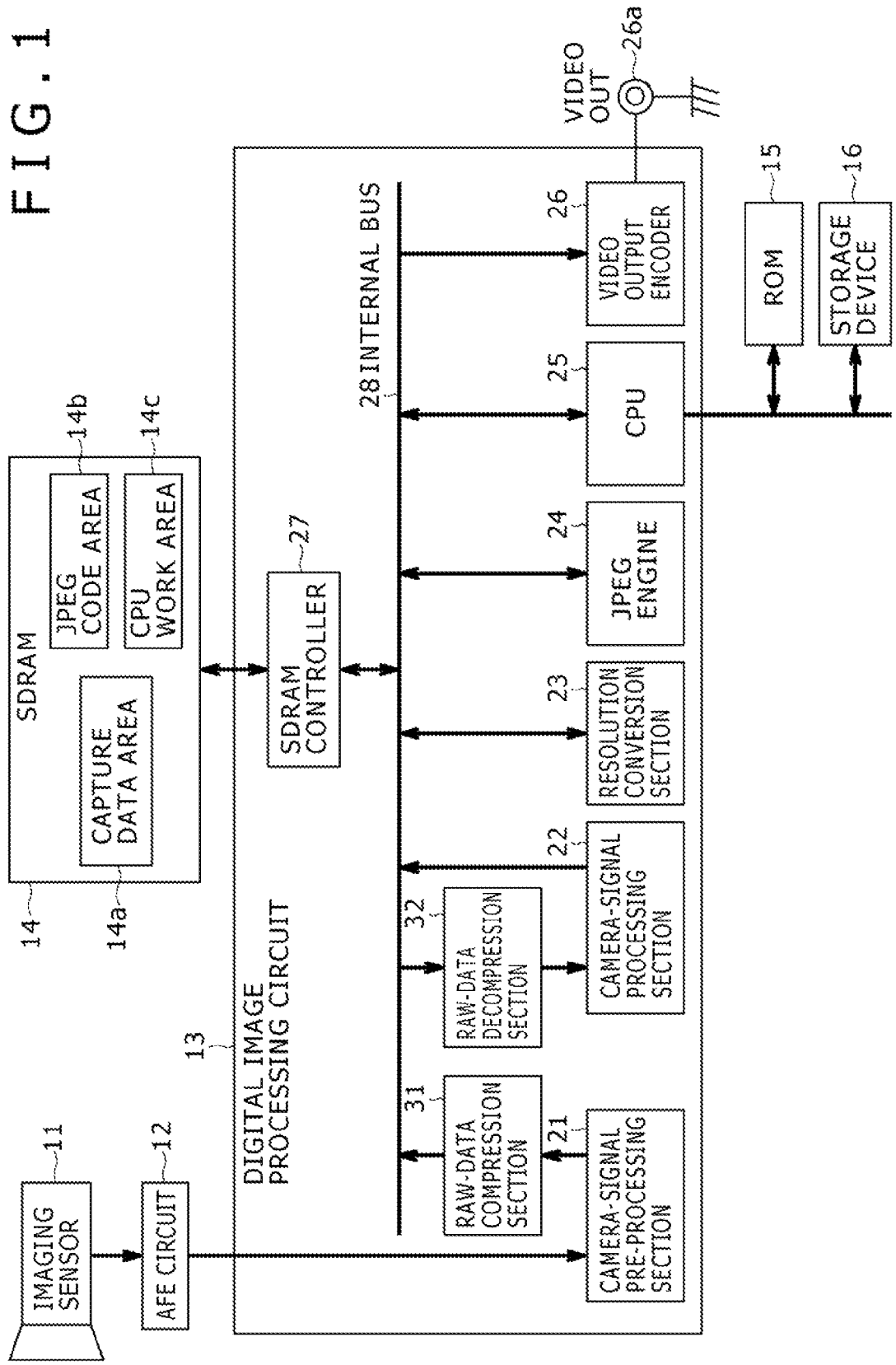
FIG. 1 is a block diagram showing the configuration of an imaging apparatus according to a first embodiment.

FIG. 1 is a block diagram showing the configuration of an imaging apparatus according to a first embodiment.

The imaging apparatus shown in FIG. 1 employs a imaging sensor 11, an AFE (analog front end) circuit 12, a digital image processing circuit 13, an SDRAM (synchronous dynamic random access memory) 14, a ROM (read only memory) 15 and a storage device 16. The digital image processing circuit 13 has a camera-signal pre-processing section 21, a camera-signal processing section 22, a resolution conversion section 23, a JPEG (joint photographic experts group) engine 24, a CPU (central processing unit) 25, a video output encoder 26 and an SDRAM controller 27. The camera-signal pre-processing section 21, the camera-signal processing section 22, the resolution conversion section 23, the JPEG engine 24, the CPU 25, the video output encoder 26 and the SDRAM controller 27 are connected to each other by an internal bus 28. These components are the components employed in the imaging apparatus in related art. In additions to the components, the digital image processing circuit 13 also includes a raw-data compression section 31 and a raw-data decompression section 32.

The imaging sensor 11 is a solid-state imaging sensor such as an image sensor having typically a CCD (charge couple device) type or a CMOS (complementary metal oxide semiconductor) type. The imaging sensor 11 is a device for converting light received from a subject of an imaging operation through a lens block not shown in the figure into an electrical image signal.

The AFE circuit 12 carries out a CDS process on the electrical image signal output by the imaging sensor 11 in order to sample the signal and hold the sampled value of the signal so as to well sustain the S/N (signal to noise) ratio of the signal. In addition, the AFE circuit 12 also carries out an AGC process in order to control the gain and an A/D (analog to digital) conversion process on the result of the CDS process in order to generate a digital image signal.

The digital image processing circuit 13 is created typically as an SoC (system on a chip) circuit or the like. In the digital image processing circuit 13, the camera-signal pre-processing section 21 carries out processing on the digital image signal received from the AFE circuit 12 and outputs raw image data as a result of the processing. The processing includes a signal correction process to compensate the digital image signal for defective pixels of the imaging sensor 11 and a shading process to compensate the digital image signal for light-quantity drops occurring at the peripheries of a lens.

The raw-data compression section 31 carries out a compression process to compress the raw image data received from the camera-signal pre-processing section 21 by adoption of a compression technique to be described later and supplies compressed raw image data obtained as a result of the compression process to the SDRAM 14 by way of the SDRAM controller 27.

On the other hand, the raw-data decompression section 32 carries out a decompression process to decompress the compressed raw image data read out from the SDRAM 14 through the SDRAM controller 27 by adoption of a decompression technique to be described later and supplies decompressed raw image data obtained as a result of the decompression process to the camera-signal processing section 22.

The camera-signal processing section 22 carries out a de-mosaic process on the raw image data received from the raw-data decompression section 32 before performing the so-called camera-signal processing or part of the camera-signal processing. The camera-signal processing includes a signal detection process for execution of AF (auto focus) control, AE (auto exposure) control and white balance control as well as an image-quality correction process represented by adjustment of the white balance. In addition, the camera-signal processing section 22 also converts the result of the image-quality correction process into a luminance signal Y and color-difference signals R-Y and B-Y in a predetermined ratio format such as 4:2:2.

The resolution conversion section 23 receives image data obtained as a result of the camera-signal processing carried out by the camera-signal processing section 22 or image data obtained as a result of a decompression/decoding process carried out by the JPEG engine 24 and converts the resolution of the image data into a resolution determined in advance.

The JPEG engine 24 carries out a compression/encoding process on the image data processed by the resolution conversion section 23 in order to generate encoded data conforming to a JPEG method. In addition, the JPEG engine 24 also carries out a decompression/decoding process on JPEG image data read out from the storage device 16. It is to be noted that, in addition to the JPEG engine 24, the digital image processing circuit 13 can also be provided with an encoding/decoding engine adopting a still-image compression method or a moving-image compression method.

The CPU 25 carries out overall control of the entire processing carried out by the digital image processing circuit 13 and the entire imaging apparatus by execution of programs stored in the ROM 15 in advance. In addition, the CPU 25 also carries out various kinds of processing for execution of the overall control.

The video output encoder 26 typically has the same configuration as an NTSC (national television standards committee) encoder. The video output encoder 26 generates an image signal for a monitor display on the basis of tire image data output by the resolution conversion section 23. The video output encoder 26 outputs the image signal to the monitor not shown in the figure or a video output terminal 26a.

The SDRAM controller 27 is a block interfacing with the SDRAM 14. Provided with components such as an address decoder, tire SDRAM controller 27 controls operations to write data into the SDRAM 14 and read out data from the SDRAM 14 in accordance with a control signal received from the CPU 25.

The SDRAM 14 is a volatile memory provided as a work area of data processing carried out by tire digital image processing circuit 13. The internal area of the SDRAM 14 is used as a capture data area 14a, a JPEG code area 14b and a CPU work area 14c. The capture data area 14a is an area used for temporarily storing data captured from the imaging sensor 11, that is, raw image data compressed by the raw-data compression section 31. The JPEG code area 14b is an area used for temporarily storing data such as image data encoded by the JPEG engine 24 and data to be used in an encoding/decoding process carried out by the JPEG engine 24. The CPU work area 14c is an area used for temporarily storing data to be used in processing earned out by the CPU 25.

The ROM 15 is a memory used for storing programs, which are each to be executed by the CPU 25, and various kinds of data to be used in execution of the programs in advance. The ROM 15 is typically a non-volatile memory such as an EEPROM (electronically erasable and programmable ROM) or a flash memory.

The storage device 16 is a device used for recording the file of encoded image data. Typically, the storage device 16 includes a recording medium such as a flash memory, an optical disk or a magnetic tape and a recording/reproduction drive for driving the recording medium.

In such an imaging apparatus, an image signal generated by the imaging sensor 11 is supplied to the AFE circuit 12 for earning out the CDS and AGC processes on the signal and then converting the result of the processes into a digital image signal which is output to the camera-signal pre-processing section 21 employed in the digital image processing circuit 13. The camera-signal pre-processing section 21 carries out processing such as a defective-pixel correction process and a shading process on the digital image signal received from the AFE circuit 12 and outputs raw image data as a result of the processing. The raw-data compression section 31 carries out a compression process to compress the raw image data received from the camera-signal pre-processing section 21 and temporarily stores compressed raw image data obtained as a result of the compression process in the SDRAM 14.

The raw-data decompression section 32 carries out a decompression process to decompress the compressed image data read out from the SDRAM 14. Then, the camera-signal processing section 22 carries out a variety of image-quality correction processes on the result of the decompression process carried out by the raw-data decompression section 32. Image data obtained as a result of the image-quality correction processes is temporarily stored in the SDRAM 14. The image data is converted the resolution thereof into appropriate resolution for displaying by the resolution conversion section 23 and then stored in the SDRAM 14 before being read out by the video output encoder 26 which then displays the result on a monitor. In this way, a camera-through image can be displayed on the monitor.

If a request for a process to record an image onto the storage device 16 is received from an input section not shown in the figure, the resolution conversion section 23 carries out a conversion process to convert the resolution of image data obtained as a result of the camera-signal processing carried out by the camera-signal processing section 22 into a resolution determined in advance for the recording process if necessary and temporarily stores the result of the conversion process in the SDRAM 14. The JPEG engine 24 reads out the image data obtained as a result of the conversion process carried out by the resolution conversion section 23 from the SDRAM 14 and carries out a compression/encoding process on the image data in order to generate encoded data which is typically stored in the SDRAM 14 on a temporary basis. Finally, the JPEG engine 24 reads out the image data obtained as a result of the compression/encoding process from the SDRAM 14 and records the image data onto the storage device 16.

In addition, the JPEG engine 24 also carries out a decompression/decoding process on image data (which is encoded data) read out from the storage device 16. Then, the resolution conversion section 23 carries out a conversion process and outputs the result to the video output encoder 26 in order to display an image on a monitor.

By providing tire digital image processing circuit 13 with the raw-data compression section 31 for compressing raw image data at a location on a route of supplying image data from the camera-signal pre-processing section 21 to the internal bus 28, tire amount of data transferred to tire SDRAM 14 through the internal bus 28 can be reduced. In addition, by providing the digital image processing circuit 13 with the raw-data decompression section 32 for decompressing raw image data at a location on a route of supplying image data from the internal bus 28 to the camera-signal processing section 22, the amount of data transferred from the SDRAM 14 to the camera-signal processing section 22 through the internal bus 28 can be decreased.

Thus, the magnitude of a transfer load borne by the internal bus 28 during imaging processes can be reduced. As a result, it is possible to shorten the time it tales to write image data into the SDRAM 14 and read out image data from the SDRAM 14. In particular, if the compression and decompression processes are made as simple as possible, the effect of shortening the processing time can be further enhanced. In addition, by lowering the frequency of image-data transfers through the internal bus 28, tire power consumption can also be suppressed as well.

On top of that, the storage capacity of the SDRAM 14 can be reduced. As an alternative, instead of reducing the storage capacity of the SDRAM 14, the storage capacity of the SDRAM 14 is kept as it is and a storage area of the SDRAM 14 can be allocated to other processing that contributes to improvement of the quality of the image and enhancement of imaging functions. To put it concretely, the storage area of the SDRAM 14 is used for storing raw image data of an amount corresponding to a plurality of frames so as to increase the number of images that can be taken successively or to raise the speed of a consecutive imaging operation. Thus, it is possible to implement a high-performance, small-size and low-cost imaging apparatus capable of shortening the time it takes to carry out at imaging process and record image data.

By the way, in the compression process carried out by the raw-data compression section 31 to compress raw image data, a reversible compression technique is adopted so as to sustain the quality of the raw image data. However, an irreversible compression technique can also be adopted as long as the irreversible compression technique results in compression distortion which has such a small amount that the compression distortion cannot be detected by the naked eye at a point of time the image signal has been converted into a luminance signal Y and color-difference signals R-Y and B-Y, that is, as long as the irreversible compression technique results in a tolerable image quality, in general, if the PSNR (peak signal to noise ratio) is in the range of 50 dB to 40 dB at a point of time the image signal has been converted into a luminance signal Y and color-difference signals R-Y and B-Y, the level of the compression distortion is tolerable.

If a fixed-length encoding technique can be adopted in the process to compress the raw image data, the size of a storage area allocated to compressed raw image data to be temporarily stored in the SDRAM 14 is fixed so that a load borne by the internal bus 28 to transfer raw image data can be reduced in a stable manner. In addition, it is also possible to simplify a process carried out by tire camera-signal processing section 22 to handle raw image data and a process to control transfers of raw image data through the internal bus 28. An example of the process carried out by the camera-signal processing section 22 to handle raw image data is a process of controlling an operation to read out the raw image data from the SDRAM 14.

If a variable-length encoding technique is adopted in the process to compress the raw image data for example, when compressed raw image data is read out from the SDRAM 14, the compressed raw image data needs to be accessed in bursts in many cases. In addition, the function of the camera-signal processing section 22 may be a function for partially processing the entire screen by making use of only a delay line of about a fraction of the length of 1H (that is, the length of the horizontal synchronization period). The entire screen is processed partially by for example dividing the screen into some strips in the vertical direction. If a fixed-length encoding technique is adopted in conjunction with such a function, the address of any arbitrary location included in the SDRAM 14 as a location at which raw image data has been stored can be computed with ease so that the raw image data can be read out from the SDRAM 14 quickly. In addition, a DMA (direct memory access) controller provided in the resolution conversion section 23 is capable of making an access to the raw image data stored in the SDRAM 14.

For the reasons described above, as will be described below, the embodiment is capable of compressing raw image data by adoption of the fixed-length encoding technique, is capable of assuring a high quality of a produced image and adopts an irreversible compression/decompression technique which can be implemented by carrying out a relatively simple process. In particular, according to the irreversible compression/decompression technique, each block composed of a fixed number of same color component pixels adjacent to each other is split into two quantization-subject areas in accordance with the state of image data, in the block aid a compression process is carried out on each of the quantization-subject areas so as to further suppress qualify deteriorations due to the compression process.

The following description explains an outline of an image compression technique adopted by the embodiment. First of all, a block used as a unit of compression is explained by referring to FIG. 2.

Figure 2:
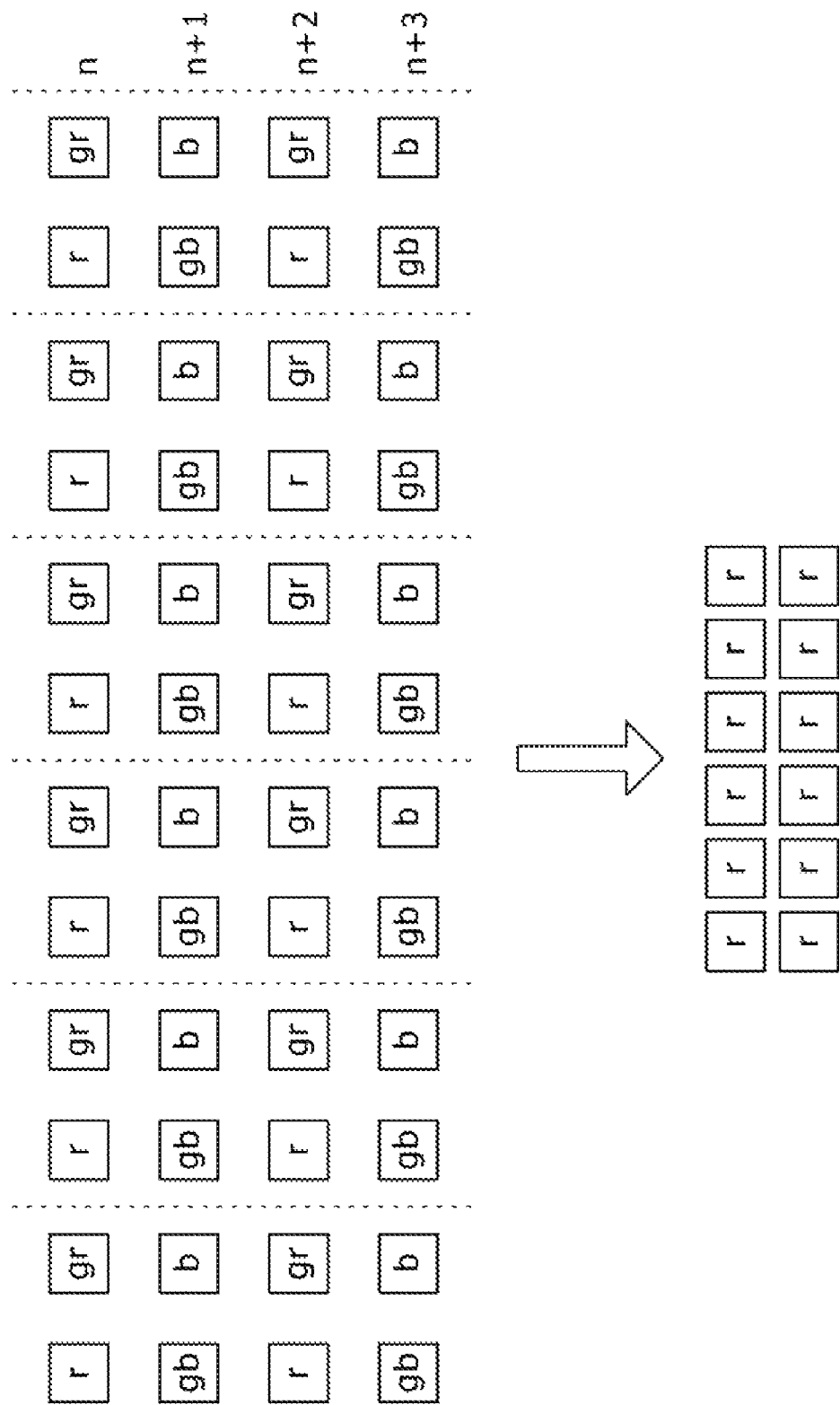
FIG. 2 is an explanatory diagram to be referred to in description of a block used as a unit of compression.

In accordance with the image compression technique adopted by the embodiment, data is compressed by taking a block composed of a fixed number of same color component pixels adjacent to each other as a unit of compression so as to result in a fixed data compression ratio. In the following description, a color pixel is also referred to simply as a pixel. Pixels composing a block can be pixels adjacent to each other only in the horizontal or vertical direction. As an alternative, however, pixels composing a block can also be pixels arranged to form a matrix composed of a plurality of rows (also referred to hereafter as lines) and a plurality of columns. The typical block shown in FIG. 2 as the unit of the data compression process is composed of 6 pixels per line×2 lines providing a total of 12 pixels. If an imaging sensor 11 adopting a Bayer array as the typical block shown in FIG. 2 is used, only r component pixels arranged to compose a block are shown like the lower array shown in tire figure. It is needless to say, however, that the gr, gb and b component pixels are also arranged to form a block composed of 6 color component pixels per line×2 lines respectively. In the following description, a color component pixel such as the r, gr, gb or b component pixel is also referred to simply as a pixel.

Figure 3:
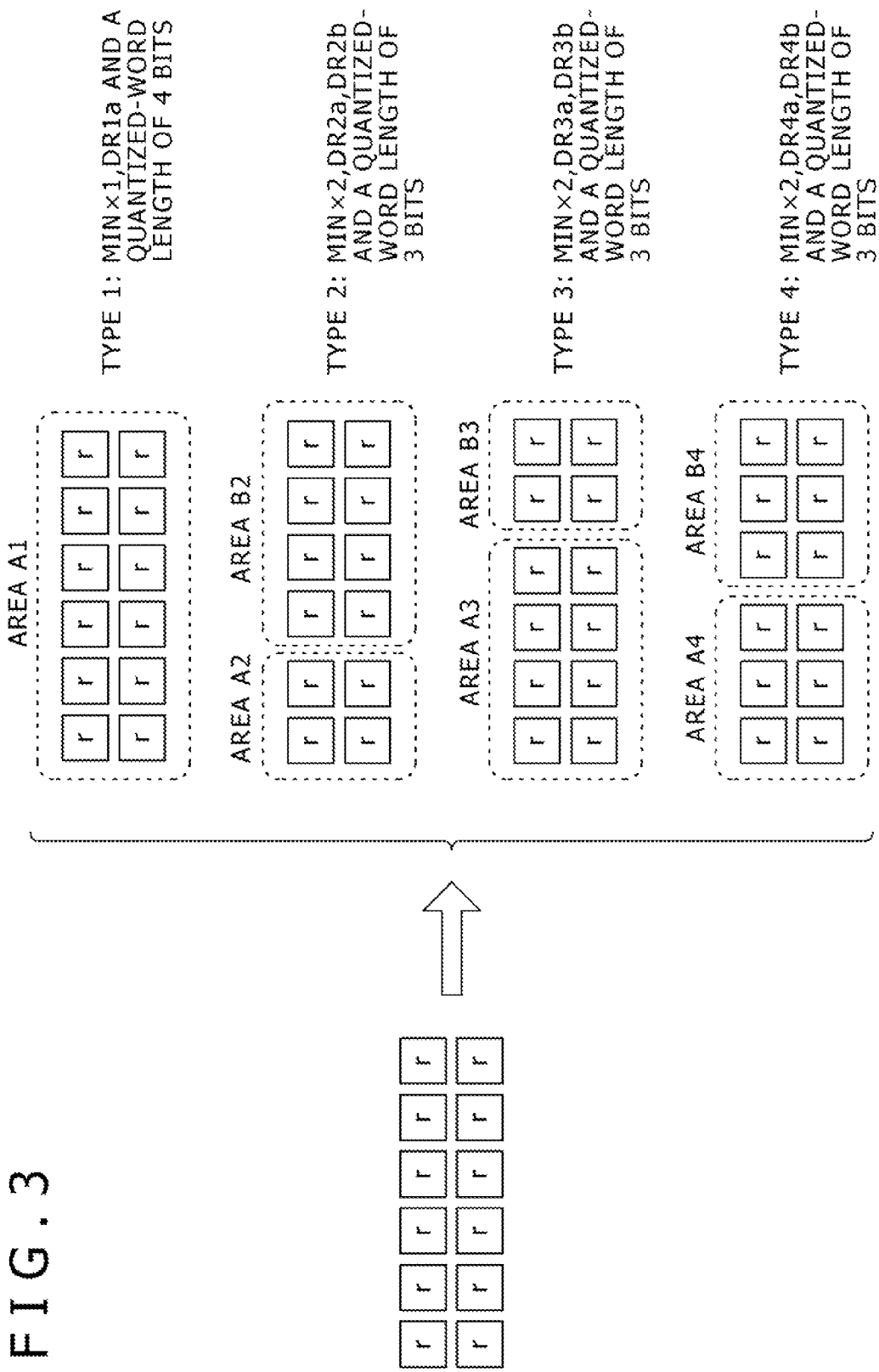
FIG. 3 is an explanatory diagram to be referred to in description of a technique for determining a block type.

FIG. 3 is an explanatory diagram referred to in description of a technique for determining a block type.

In this embodiment, a block type corresponding to one of four division patterns shown in FIG. 3 is determined to be a proper block type most optimum for a block composed of 12 pixels adjacent to each other in accordance with the state of data in the block in order to generate good compressed image data from the block. In the following description, the division pattern is also referred to as a block type.

Block type 1 is the type of a block not to be split into quantization-subject areas in a quantization process for the block or a block handled as a block as composed of only quantization-subject area A1 in the quantization process for the block. In the following description, the quantization-subject area is also referred to as a partial area, a block partial area or simply an area. Block type 2 is the type of a block to be split into areas A2 and B2 in a quantization process for tire block. Area A2 is composed of 2 pixels per line×2 lines providing a total of 4 pixels. Area B2 is composed of 4 remaining pixels per line×2 lines providing a total of 8 remaining pixels. Block type 3 is the type of a block to be split into areas A3 and B3 in a quantization process for the block. Area A3 is composed of 4 pixels per line×2 lines providing a total of 8 pixels. Area B3 is composed of 2 remaining pixels per line×2 lines providing a total of 4 remaining pixels. Block type 4 is the type of a block to be split into areas A4 and B4 in a quantization process for the block. Area A4 is composed of 3 pixels per line×2 lines providing a total of 6 pixels. Area B4 is composed of 3 remaining pixels per line×2 lines providing a total of 6 remaining pixels.

Compressed image data generated in this embodiment by adoption of the data compression technique as compressed image data per block basically has a structure shown in FIG. 6. As shown in the figure, the structure of compressed image data of a block includes a minimum value of data for all pixels in every specific area in the block, a value representing the dynamic range of the data of all pixels in tire specific area and quantized data normalized by making use of the dynamic range of the specific area as quantized data of all pixels in the specific area. The minimum value is a DC offset component of the data of all pixels. The dynamic range is the difference between a maximum value of the data of all pixels and the minimum value of the data of all pixels. The amount of compressed image data is made uniform for all blocks. Thus, if the quantized-word length of the data of each pixel is uniform, the wider the dynamic range of art area, the lower the precision of the quantization.

In order to solve this problem, in this embodiment, the block dynamic range is computed for every area in a block and for each of the four block types defined for the block and then one of the block types is selected as a proper block type for the block to give a smallest sum of dynamic ranges computed for the areas in the block among all computed dynamic-range sums. Let us assume for example that an edge exists between the second pixel from the left side of a typical block and the third pixel from the same left side. Then, dynamic ranges of areas of the typical block are computed for each of the four block types and a sum of computed dynamic ranges is found for each of the four block types. Subsequently, a proper block type is selected for the typical block among the four block types as a block type having a smallest sum of dynamic ranges among the four block types. In the case of this typical block, block type 2 is selected because the sum of the dynamic ranges computed individually for areas A2 and B2 is smallest among all the dynamic-range sums computed for the four block types. Then, the data of each pixel is quantized in conformity with block type 2 splitting the typical block into areas A2 and B2 and in accordance with the dynamic ranges computed for areas A2 and B2. Since the sum of the dynamic ranges computed individually for areas A2 and B2 is smallest among all the dynamic-range sums computed for the four block types, the precision of the quantization process carried out on areas A2 and B2 is improved. In addition, the length of the quantized word can be reduced. If the differences in data level among pixels in the entire block are small, on the other hand, block type 1 should be selected. In this case, even if the data of each pixel is quantized in accordance with the dynamic range computed for area A1, that is, for the entire block, deteriorations of the precision of the quantization process can be suppressed.

It is to be noted that, if block type 1 is selected in accordance with the data compression technique as described above, the compressed image data includes a dynamic range DR1$a$ computed for area A1 and a minimum value of the data as shown in FIG. 3. If block type 2 is selected, the compressed image data includes a dynamic range DR2$a$ computed for area A2 and a minimum value for area A2 as well as a dynamic range DR2$b$ computed for area B2 and a minimum value for area B2 as shown in the same figure. If block type 3 is selected, the compressed image data includes a dynamic range DR3$a$ computed for area A3 and a minimum value for area A3 as well as a dynamic range DR3$b$ computed for area B3 and a minimum value for area B3 as shown in the same figure. If block type 4 is selected, the compressed image data includes a dynamic range DR4$a$ computed for area A4 and a minimum value for area A4 as well as a dynamic range DR4$b$ computed for area B4 and a minimum value for area B4 as shown in the same figure.

The following description more concretely explains a compression/decompression process making use of such a block type. It is to be noted that, as an example used in the following description, raw image data output from the camera-signal pre-processing section 21 has a length of 14 bits per pixel whereas a block is composed of 12 sane color component pixels adjacent to each others. Raw data is compressed in block units to result in a fixed compression ratio. To put it concretely, raw image data of 168 bits per block is compressed into compressed image data of 64 bits. In addition, as shown in FIG. 3, the quantized-word length of the data of each pixel is 4 bits only for block type 1 and 3 bits for each partial area of the other block types.

Figure 4:
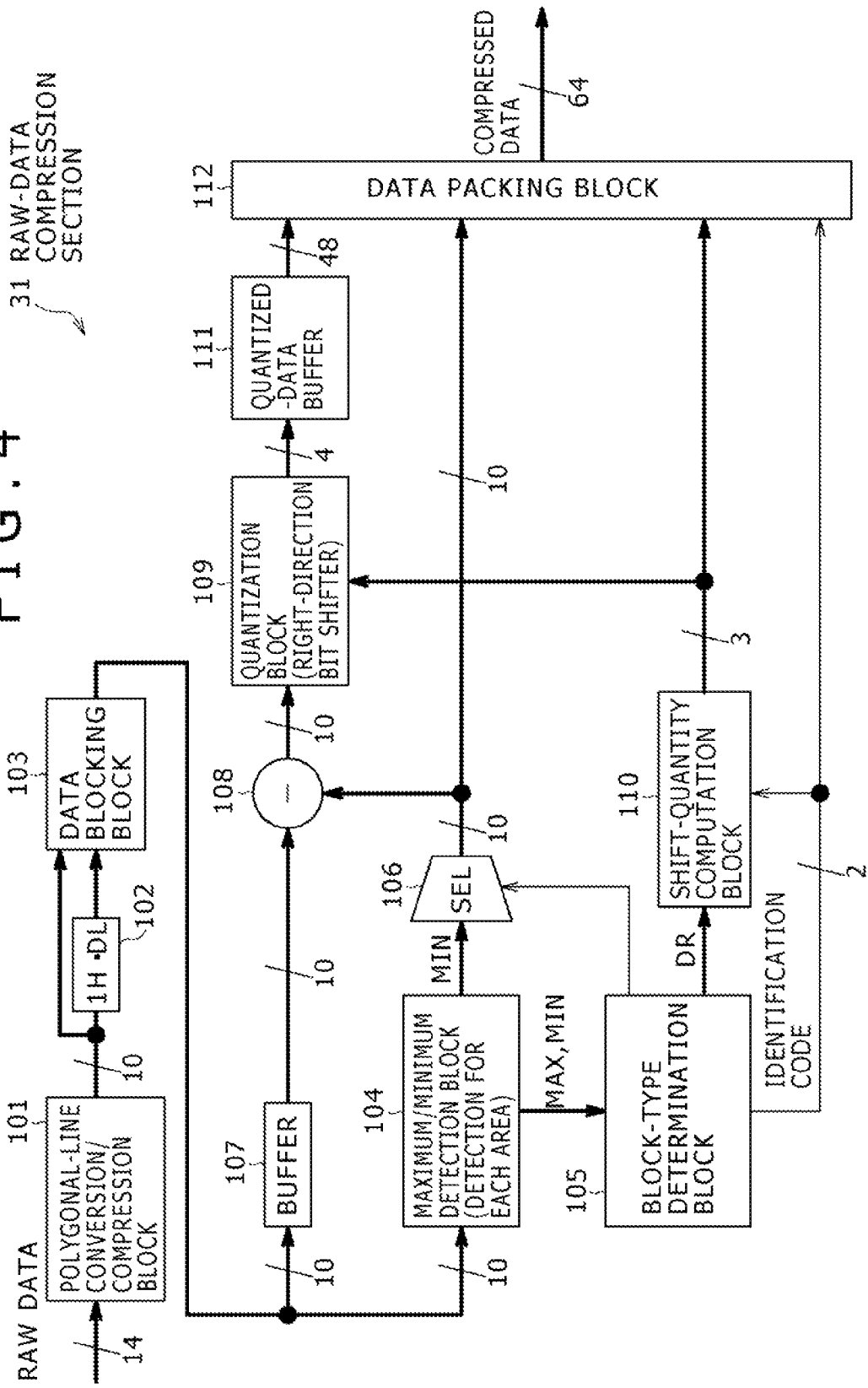
FIG. 4 is a block diagram showing the internal configuration of a raw-data compression section.

FIG. 4 is a block diagram showing the internal configuration of the raw-data compression section 31.

As shown in FIG. 4, tire raw-data compression section 31 employs a polygonal-line conversion/compression block 101, a delay line 102, a data, blocking block 103, a maximum/minimum detection block 104, a block-type determination block 105, a minimum-value selector 106, a buffer 107, a subtractor 108, a quantization block 109, a shift-quantity computation block 110, a quantized-data buffer 111 and a data packing block 112.

The polygonal-line conversion/compression block 101 compresses input raw image data of 14 bits per pixel into compressed image data of 10 bits per pixel in a non-linear manner after lowering the gradation of the image data in order to increase the overall compression ratio by approximation making use of a polygonal line. The polygonal-line conversion/compression block 101 increases the overall compression ratio by lowering the gradation by as large a quantity as possible prior to a later compression procedure for compressing input raw image data of 14 bits per pixel into compressed image data of 10 bits per pixel. Thus, the polygonal-line conversion/compression block 101 can be omitted, depending on the target compression ratio. It is to be noted that, if the polygonal-line conversion/compression block 101 is omitted, an inverse polygonal-line conversion/compression section 208 serving as the counterpart component of the polygonal-line conversion/compression block 101 also needs to be omitted from the output stage of the raw-data decompression section 32 to be described later by referring to FIG. 8.

FIG. 5 is a diagram showing a typical polygonal line used in the polygonal-line conversion/compression block 101.

The polygonal line shown in FIG. 5 is divided at four points into five straight-line segments having gradients different from each other. The polygonal line is used in a typical process to convert tire gradation of the input data into a gradation assigned to output data. This typical process is carried out so that, the smaller the input data, that is, the darker the data or the paler the color, the higher the gradation assigned to the output data according to human visual performance characteristics, in the figure, a straight-line segment having a relatively large gradient represents relatively small input data, that is, relatively dark input data or input data with a relatively pale color on the left-hand side portion of the horizontal axis and output data placed on the lower side portion of the vertical axis as output data having a relatively large gradation assigned thereto. Such a polygonal line is typically provided for each color component and a proper polygonal line provided for a color component is selected in the gradation conversion process carried out on input data of a pixel having the color component.

As described above, the polygonal-line conversion/compression block 101 compresses input raw image data of 14 bits per pixel into compressed output image data of 10 bits per pixel after lowering the gradation of the input raw image data on the basis of the polygonal line shown in FIG. 5. For example, the polygonal-line conversion/compression block 101 compresses input raw image data of 14 bits per pixel into compressed output image data of 10 bits per pixel by dividing the input data by 16, that is, by shifting the input data in a direction to the right toward the least significant bit of the input data by 4 bits. A bit value determined by applying typically the half-adjust technique to the 4 bits discarded in the shift operation is added to the least significant bit of the post-shifting image data. As an alternative, the polygonal-line conversion/compression block 101 finds output image data from input image data by making use of a ROM table stored in advance in a ROM as a table associating input image data with output image data which is supposed to be a result of the gradient-conversion and compression processes described above.

The reader is requested to refer back to FIG. 4.

The delay line 102 delays image data output by the polygonal-line conversion/compression block 101 by a 1H period. The data blocking block 103 outputs image data separated into blocks each composed of 12 pixels (=6 pixels per line×2 lines) as described earlier. The image data output by the data blocking block 103 is composed of the image data output by the polygonal-line conversion/compression block 101 and the image data delayed by the delay line 102. It is to be noted that, in this embodiment; raw image data supplied to the raw-data compression section 31 has been separated into pieces of raw image data for the color components.

The maximum/minimum detection block 104 receives image data of a block composed of 12 pixels of the same color component from the data blocking block 103, detecting maximum and minimum values of each block partial area in the block for every block type defined for the block. The maximum/minimum detection block 104 provides the block-type determination block 105 with the maximum and minimum values detected for every block type as the maximum and minimum values of each block partial area conforming to the block type. The maximum/minimum detection block 104 also provides the minimum-value selector 106 with the minimum value detected for every block type as the minimum value of each block partial area conforming to the block type.

For each block partial area conforming to every block type, the block-type determination block 105 computes a dynamic range by subtracting the minimum value for the block partial area from the maximum value for the same area. Then, for even block type, the block-type determination block 105 finds a sum of dynamic ranges computed for the block type. Subsequently, the block-type determination block 105 determines a proper block type that provides a smallest sum of dynamic ranges. The block-type determination block 105 then outputs an identification code identifying the proper block type to the data packing block 112. The block-type determination block 105 also outputs the dynamic ranges of the block partial areas conforming to the proper block type to the shift-quantity computation block 110. In addition, the block-type determination block 105 also outputs a select signal according to the proper block type to the minimum-value selector 106.

The minimum-value selector 106 selects minimum values according to the select signal received from the block-type determination block 105 among the minimum values received from the maximum/minimum detection block 104 and outputs the selected minimum values to the subtracter 108 and the data packing block 112. In this way, the minimum-value selector 106 outputs minimum values for the proper block type selected by the minimum-value selector 106.

The buffer 107 is used for delaying pixel data output by the data blocking block 103 by a delay period equal to the time it takes to carry out the processes in the maximum/minimum detection block 104 and the minimum-value selector 106 in order to make a timing to supply the data of every pixel in the block from the buffer 107 to the subtracter 108 coincide with a timing to supply the selected minimum values from the minimum-value selector 106 to the subtracter 108.

The subtracter 108 subtracts the minimum value received from the minimum-value selector 106 from the pixel data received from tire data blocking block 103 through the buffer 107 for even; block partial area. As described above, the minimum values received from the minimum-value selector 106 are two minimum values for respectively the two block partial areas conforming to the block type selected by the block-type determination block 105. Thus, the subtracter 108 subtracts the minimum value for a specific one of the block partial area from the pixel data of each pixel included in the specific block partial area and subtracts the minimum value for the block partial area from the pixel data of each pixel included in the other block partial area. As described earlier, the minimum value of a block partial area is the DC offset component of the block partial area. Thus, the subtracter 108 provides the quantization block 109 with pixel data obtained as a result, of subtracting the DC offset component of a block partial area from minuend pixel data of each pixel included in the block partial area. Thus, the quantized-word length used in the quantization block 109 can be set at an even smaller value.

Let us assume that the data of each pixel on two lines of a block are supplied concurrently from the data blocking block 103 by way of the buffer 107 to the subtracter 108 for carrying out the subtraction described above and also assume that the block-type determination block 105 selects block type 2 as the proper block type. In this case, in a period of supplying data of the first and second pixels on each of the two lines of area A2 from the buffer 107 to the subtractor 108, the minimum-value selector 106 supplies the minimum value for area A2 to the subtractor 108 whereas the subtractor 108 subtracts the minimum value from the data of the first and second pixels. Then, in a period of supplying data of the third to sixth pixels on each of the two lines of area B2 from the buffer 107 to the subtractor 108, the minimum-value selector 106 supplies the minimum value for area B2 to the subtractor 108 whereas the subtractor 108 subtracts the minimum value from the data of the third to sixth pixels.

The quantization block 109 quantizes the pixel data received from the subtractor 108 as pixel data resulting from the process earned out by the subtractor 108 to subtract the DC offset component of a block partial area from minuend pixel data of each pixel included in the block partial area. The quantization block 109 is typically an integer-type divisor configured to divide pixel data received from the subtractor 108 by a divisor received from the shift-quantity computation block 110 as a quantity corresponding to a dynamic range. In actuality, however, tire number of quantization steps in a quantization process carried out by quantization block 109 is a power of 2. Thus, in the case of such a configuration, the integer-type divisor functioning as the quantization block 109 can be actuality implemented as a right-direction bit shifter for shifting data received from the subtractor 108 as the 10-bit data of each pixel in a direction to the right toward the least significant bit of the 10-bit data by as many bits as indicated by a shift quantity specified by the shift-quantity computation block 110 which computes the shift quantity for each block partial area on the basis of a dynamic range received from the block-type determination block 105 as the dynamic range of the block partial area. Thus, the number of bits included in the quantized data obtained as a result of the quantization process is smaller than the original data of the pixel. In addition, the size of the circuit implementing the quantization block 109 can be made small.

The quantization block 109 outputs a 4-bit result of division or a 4-bit result of quantization to the quantized-data buffer 111 for every pixel without regard to the block type. The quantized-data buffer 111 is used for storing such results of quantization for a block which is composed of 12 pixels. It is to be noted that, in this embodiment, the length of the quantized word is set at 4 bits for block type 1 or 3 bits for block types 2 to 4 as shown in FIG. 3. In order to set the length of compressed image data in each block at a fixed value of 64 bits, the data packing block 112 carries out a packing process to insert 48-bit quantized data received from the quantized-data buffer 111 into the final compressed data. Since the quantization block 109 outputs a 4-bit result of division or a 4-bit result of quantization to the quantized-data buffer 111 for every pixel without regard to the block type and the length of the quantized word, the data packing block 112 discards the unnecessary bit in the packing process from the 4-bit result of division or the 4-bit result of quantization in the case of block types 2 to 4.

The shift-quantity computation block 110 receives a dynamic range DR of every block partial area from the block-type determination block 105 and converts the dynamic range DR into a quantity to be used as a shift quantity in the shifting operation carried out by the quantization block 109. The shift-quantity computation block 110 carries out either one or two operations in accordance with the proper block type determined by the block-type determination block 105.

First of all, in the case of block type 1, the quantization block 109 quantizes data of 10 bits per pixel into data of 4 bits per pixel. The shift-quantity computation block 110 outputs a shift quantity in accordance with the dynamic range DR supplied by the block-type determination block 105 to the quantization block 109 as follows.

For 0≦DR≦15, the shift-quantity computation block 110 outputs a shift quantity of 0 bits to the quantization block 109 as the number of bits by which the input pixel data is to be shifted in a direction to the right toward the least significant bit of the input pixel data.

For 16≦DR≦31, the shift-quantity computation block 110 outputs a shift quantity of 1 bit to the quantization block 109 as tire number of bits by which the input pixel data is to be shifted in a direction to the right toward the least significant bit of the input pixel data.

For 32≦DR≦63, the shift-quantity computation block 110 outputs a shift quantity of 2 bits to the quantization block 109 as the number of bits by which the input pixel data is to be shifted in a direction to the right toward the least significant bit of the input pixel data.

For 64≦DR≦127, the shift-quantity computation block 110 outputs a shift quantity of 3 bits to the quantization block 109 as the number of bits by which the input pixel data is to be shifted in a direction to the right toward the least significant bit of the input pixel data.

For 128≦DR≦255, the shift-quantity computation block 110 outputs a shift quantity of 4 bits to the quantization block 109 as the number of bits by which the input pixel data is to be shifted in a direction to the right toward the least significant bit of the input pixel data.

For 256≦DR≦511, the shift-quantity computation block 110 outputs a shift quantity of 5 bits to the quantization block 109 as the number of bits by which the input pixel data is to be shifted in a direction to the right toward the least significant bit of the input pixel data.

For 512≦DR≦1023, the shift-quantity computation block 110 outputs a shift quantity of 6 bits to the quantization block 109 as the number of bits by which the input pixel data is to be shifted in a direction to the right toward the least significant bit of the input pixel data.

In the case of block types 2 to 4, on the other hand, the quantization block 109 quantizes data of 10 bits per pixel into data of 3 bits per pixel. The shift-quantity computation block 110 outputs a shift quantity in accordance with the dynamic range DR supplied by the block-type determination block 105 to the quantization block 109 as follows.

For 0≦DR≦7, the shift-quantity computation block 110 outputs a shift quantity of 0 bits to the quantization block 109 as the number of bits by which the input pixel data is to be shifted in a direction to the right toward the least significant bit of the input pixel data.

For 8≦DR≦15, the shift-quantity computation block 110 outputs a shift quantity of 1 bit to the quantization block 109 as the number of bits by which the input pixel data is to be shifted in a direction to the right toward the least significant bit of the input pixel data.

For 16≦DR≦31, the shift-quantity computation block 110 outputs a shift quantity of 2 bits to the quantization block 109 as the number of bits by which the input pixel data is to be shifted in a direction to the right toward the least significant bit of the input pixel data.

For 32≦DR≦63, the shift-quantity computation block 110 outputs a shift quantity of 3 bits to the quantization block 109 as the number of bits by which the input pixel data is to be shifted in a direction to the right toward the least significant bit of the input pixel data.

For 64≦DR≦127, the shift-quantity computation block 110 outputs a shift quantity of 4 bits to the quantization block 109 as the number of bits by which the input pixel data is to be shifted in a direction to the right toward the least significant bit of the input pixel data.

For 128≦DR≦255, the shift-quantity computation block 110 outputs a shift quantity of 5 bits to the quantization block 109 as the number of bits by which the input pixel data is to be shifted in a direction to the right toward the least significant bit of the input pixel data.

For 256≦DR≦511, the shift-quantity computation block 110 outputs a shift quantify of 6 bits to the quantization block 109 as the number of bits by which the input pixel data is to be shifted in a direction to the right toward the least significant bit of the input pixel data.

For 512≦DR≦1023, the shift-quantity computation block 110 outputs a shift quantify of 7 bits to the quantization block 109 as the number of bits by which the input pixel data is to be shifted in a direction to the right toward the least significant bit of the input pixel data.

The shift quantity computed for a pixel under the conditions described above indicates the dynamic range of a block partial area including the pixel. Thus, by including the shift quantity and the quantized pixel data obtained as a result of a quantization process making use of the shift quantity in the compressed image data of the pixel, the raw-data decompression section 32 is capable of decompressing the quantized pixel data included in the compressed data into the original data of the pixels on the basis of the shift quantity included in the same compressed image data.

As described above, tire quantized-data buffer 111 is temporarily used for accumulating pieces of quantized pixel data of one block which is composed of 12 pixels received from the quantization block 109.

The data packing block 112 carries out a packing process to form compressed image data having a length of 64 bits per block from a block of 48-bit quantized data received from the quantized-data buffer 111, 2 values received from the minimum-value selector 106 as the minimum values for the two block partial areas of the block, 2 quantities received from tire shift-quantity computation block 110 as the shift quantities for the two block partial areas of the block and a code received from the block-type determination block 105 as an identification code for identifying the proper block type determined by the block-type determination block 105 for the block.

FIG. 6 is a diagram showing structures of compressed image data generated in the packing process carried out by the data packing block 112 employed in the raw-data compression section 31 as compressed image data of one block. As shown in FIG. 6, the raw-data compression section 31 generates compressed image data having one of four structures corresponding to the four block types respectively. As a feature common to the four structures, in any one of the four structures, the compressed image data has a length of 64 bits per block and the identification code of 2 bits is placed at the head of the structure as a code for identifying the proper block type selected for the block of the compressed image data.

In the case of block type 1, the identification code is followed by a 10-bit minimum value for area A1, a 3-bit shift quantity used in the quantization process to shift the data of each pixel in area A1, 48-bit (=4 bits per pixel×12 pixels) quantized data of 12 pixels in area A1 and a 1-bit empty area at placed the end of the data structure in order to make the total number of bits included in the compressed image data equal to 64.

In the case of block types 2 to 4, tire identification code is followed by a 10-bit minimum value for area A (corresponding one of areas A2, A3 and A4), a 3-bit shift quantity used in the quantization process to shift, the data of each pixel in area A (corresponding one of areas A2, A3 and A4), a 10-bit minimum value for area B (corresponding one of areas B2, B3 and B4), a 3-bit shift quantify used in the quantization process to shift the data of each pixel in area B (corresponding one of areas B2, B3 and B4), quantized data of pixels in area A (corresponding one of areas A2, A3 and A4) and quantized data of pixels in area B (corresponding one of areas B2, B3 and B4). As shown in FIG. 6, the minimum values and the shift quantities are laid out in the data structure at positions common to block types 2, 3 and 4. However, the location and length of the quantized data of each pixel in every block partial area vary by block type due to the fact that the number of pixels included in each block partial area varies from block type to block type. Thus, the raw-data decompression section 32 needs to identify the block type by making use of the identification code in order to determine the location and length of the quantized pixel data of every pixel in each block partial area.

It is to be noted that, if a shift register is not used as the quantization block 109 for carrying out a quantization process on the data of each pixel typically, numerical values used in the quantization process as the values of the dynamic ranges can be packed into the structure of compressed image data in place of the shift, quantities.

In tire embodiment described above, a difference obtained by subtracting a minimum value from the data of each pixel in every block partial area is subjected to the quantization process. As an alternative, a difference obtained by subtracting a minimum value from each pixel data excluding the minimum value and the maximum value in every block partial area can also be subjected to the quantization process. In the case of the alternative, the compressed image data no longer includes quantized data of each pixel having the minimum and maximum values in each block partial area. Instead, the compressed image data additionally includes a maximum value for every block partial area as well as information on the positions of the pixels having the minimum and maximum values in each block partial area. Either the typical data structures shown in FIG. 6 or the data structures of the alternative is properly selected on tire basis of parameters such as the number of pixels included in the block or included in each block partial area, the number of bits in the data, of a pixel the length of the quantized word and the number of bits in the compressed image data.

Figure 7:
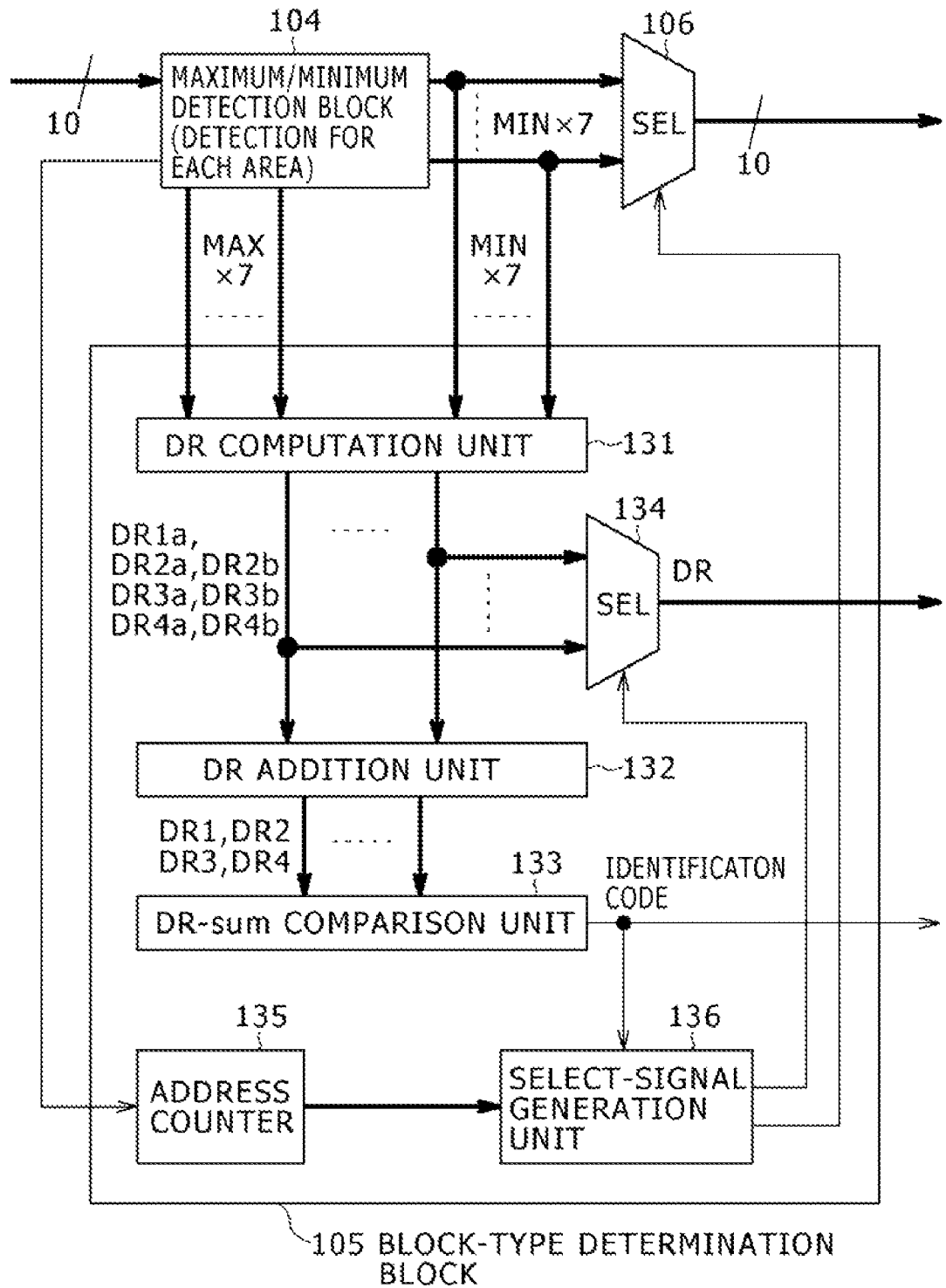
FIG. 7 is a diagram showing the internal configuration of a block-type determination block.

FIG. 7 is a diagram showing the internal configuration of the block-type determination block 105.

As shown in the figure, the block-type determination, block 105 employs a DR computation unit 131, a DR addition unit 132, a DR-sum comparison unit 133, a DR selector 134, an address counter 135 and a select-signal generation unit 136.

The DR computation unit 131 computes the dynamic ranges DR1$a$, DR2$a$, DR2$b$, DR3$a$, DR3$b$, DR4$a$ and DR4$b$ of areas A1, A2, B2, A3, B3, A4 and B4 respectively. As described before, the dynamic range of a block partial area is the difference between the maximum value of data of pixels in the block partial area and the minimum value of data of pixels in the block partial area. Thus, the DR computation unit 131 computes the dynamic range of a block partial area by subtracting the minimum value of data of pixels in the block partial area from the maximum value of data of pixels in the block partial area. As shown in the figure, the DR computation unit 131 receives the maximum and the minimum values from the maximum/minimum detection block 104 for every block partial area. The DR computation unit 131 supplies the computed dynamic ranges to the DR addition unit 132 and the DR selector 134.

For each block type, the DR addition unit 132 finds the sum of dynamic ranges received from the DR computation unit 131 as the dynamic ranges of the block partial areas for the block type. That is to say, the dynamic-range sums DR1, DR2, DR3 and DR4 for block types 1, 2, 3 and 4 respectively are found in accordance with Eqs. (1), (2), (3) and (4) respectively as follows:

$$DR1 = DR1a \quad (1)$$

$$DR2 = DR2a + DR2b \quad (2)$$

$$DR3 = DR3a + DR3b \quad (3)$$

$$DR4 = DR4a + DR4b \quad (4)$$

The DR addition unit 132 outputs the dynamic-range sums DR1, DR2, DR3 and DR4 to the DR-sum comparison unit 133 which then compares the dynamic-range sums DR1, DR2, DR3 and DR4 with each other to find the smallest one among the dynamic-range sums DR1, DR2, DR3 and DR4. Subsequently, the DR-sum comparison unit 133 determines a block type corresponding to the smallest dynamic-range sum as a proper block type, outputting a 2-bit identification code representing the proper block type to the select-signal generation unit 136, the shift-quantity computation block 110 and the data packing block 112.

The DR selector 134 selects one of the dynamic ranges DR1$a$, DR2$a$, DR2$b$, DR3$a$, DR3$b$, DR4$a$ and DR4$b$ received from the DR computation unit 131 in accordance with the select signal received from the select-signal generation unit 136, outputting the selected dynamic range to the shift-quantity computation block 110 as a dynamic range for the proper block type.

As described earlier, the maximum/minimum detection block 104 detects maximum and minimum values of data of pixels in every block partial area for each block type. Each time the maximum/minimum detection block 104 completes detection of maximum and minimum values of data of pixels in a block partial area, the maximum/minimum detection block 104 outputs a detection completion signal to the address counter 135. Triggered by the detection completion signal received from the maximum/minimum detection block 104, the address counter 135 increments its contents representing the number of block partial areas processed so far. That is to say, tire address courtier 135 increments its contents synchronously with the timings of the detection completion signal.

When the contents of the address counter 135 are incremented to a predetermined value, the address counter 135 outputs a timing signal to the select-signal generation unit 136. In the case of this embodiment, the total number of block partial areas (that is, areas A1, A2, B2, A3, B3, A4 and B4) for all block types are 7. Thus, when the contents of the address counter 135 are incremented to 7 indicating completion of the processing carried out on all the 7 block partial areas, the address counter 135 outputs the timing signal to the select-signal generation unit 136. The select-signal generation unit 136 outputs a select signal as a signal representing the identification code received from the DR-sum comparison unit 133 to the minimum-value selector 106 and the DR selector 134 with a timing determined by the timing signal received from the address counter 135. Receiving the select signal from the select-signal generation unit 136, the minimum-value selector 106 selects minimum values for the block type identified by the identification code represented by the select signal received from the select-signal generation unit 136 and outputs the selected minimum values to the subtracter 108 and the data packing block 112 in an order determined in advance. By the same token, the DR selector 134 selects dynamic ranges for the block type identified by the identification code represented by the select signal received from the select-signal generation unit 136 and outputs the selected dynamic ranges to the shift-quantity computation block 110 in an order determined in advance.

Let us assume for example that the DR-sum comparison unit 133 generates an identification code of 00 representing block type 1. In this case, the select-signal generation unit 136 outputs a select signal representing the identification code of 00 to the minimum-value selector 106 and the DR selector 134 with a timing determined by the timing signal output by the address counter 135. Receiving the select signal from the select-signal generation unit 136, the minimum-value selector 106 selects the minimum value of area A1 and outputs the selected minimum value to the subtractor 108 and the data packing block 112 as the minimum value for block type 1. By the same token, the DR selector 134 selects the dynamic range DR1$a$ of area A1 and outputs the selected dynamic range DR1$a$ to the shift-quantity computation block 110 as the dynamic range for block type 1. Next, let us assume for example that the DR-sum comparison unit 133 generates an identification code of 01 representing block type 2. In this case, the select-signal generation unit 136 outputs a select signal representing the identification code of 01 to the minimum-value selector 106 and the DR selector 134 with a timing determined by the timing signal output by the address counter 135. Receiving the select signal from the select-signal generation unit 136, the DR selector 134 first outputs the dynamic range DR2$a$ and then the minimum-value selector 106 outputs the minimum value for area A2. Subsequently, the DR selector 134 outputs the dynamic range DR2$b$ and then the minimum-value selector 106 outputs the minimum value for area B2.

Next, let us assume for example that the DR-sum comparison unit 133 generates an identification code of 10 representing block type 3. In this case, the select-signal generation unit 136 outputs a select signal representing the identification code of 10 to the minimum-value selector 106 and the DR selector 134 with a timing determined by the timing signal output by the address counter 135. Receiving the select signal from the select-signal generation unit 136, the DR selector 134 first outputs the dynamic range DR3$a$ and then the minimum-value selector 106 outputs the minimum value for area A3. Subsequently, the DR selector 134 outputs tire dynamic range DR3$b$ and then the minimum-value selector 106 outputs the minimum value for area B3. Next, let us assume for example that the DR-sum comparison unit 133 generates an identification code of 11 representing block type 4. In this case, the select-signal generation unit 136 outputs a select signal representing the identification code of 11 to the minimum-value selector 106 and the DR selector 134 with a timing determined by the timing signal output by the address counter 135. Receiving the select signal from the select-signal generation unit 136, the DR selector 134 first outputs the dynamic range DR4$a$ and then the minimum-value selector 106 outputs the minimum value for area A4. Subsequently, the DR selector 134 outputs the dynamic range DR4$b$ and then the minimum-value selector 106 outputs the minimum value for area B4.

As described above, in the block-type determination block 105, the DR-sum comparison unit 133 determines a block type corresponding to the smallest, dynamic-range sum as a proper block type. Thus, data of pixels in a block is quantized by appropriately dividing the block into quantization-subject areas in accordance with a proper block type which is selected on the basis of the state of the image in the block so as to reduce deteriorations of the image quality. As is obvious from Eqs. (1) to (4), however, a dynamic-range sum is found as the sum of the dynamic ranges of two block partial areas. Thus, prior to a process to compare the dynamic-range sums DR1 to DR4 with each other with a high degree of accuracy, the dynamic-range sum DR1 found by making use of Eq. (1) needs to be further doubled in accordance with an equation of DR1=DR1$a$×2 or, as an alternative, each of the dynamic-range sums DR2, DR3 and DR4 found by making use of Eqs. (2), (3) and (4) respectively needs to be further multiplied by ½ as follows: DR2×½, DR3×½ and DR4×½ respectively.

In the case of block type 1, however, only one minimum value aid one shift quantity are included for area A1 in the structure of compressed image data as shown in FIG. 6. Thus, the length of the quantized word can be set at 4 bits which are larger that the quantized-word length of 3 for the other block types. As a result since the range of allowable dynamic ranges for block type 1 can be said to be wider than those of the other block types, setting DR1=DR1$a$ in accordance with the embodiment as indicated by Eq. (1) puts block type 1 in a position to be selected most likely. The weight having the value of 1 in Eq. (1) for computing the dynamic-range sum DR1 to be compared with the other dynamic-range sums in a process to select a proper block type offers a merit of avoiding an incorrect operation such as selection of a block type providing an inappropriate block partial area due to typically noises or the like.

Figure 8:
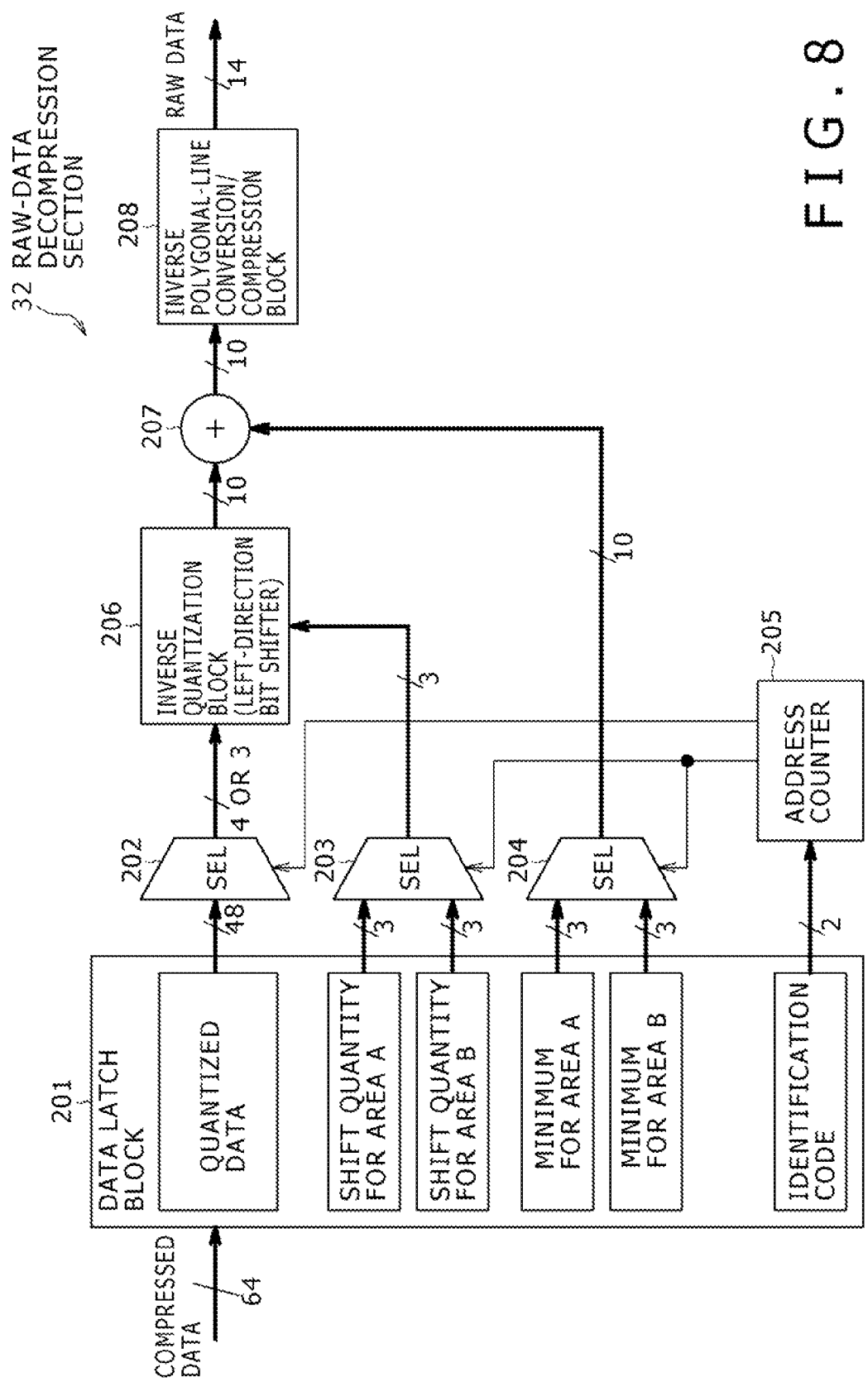
FIG. 8 is a block diagram showing the internal configuration of a raw-data decompression section.

Please keep in mind that it is also possible to provide a configuration in which the user is allowed to cam out an input operation to select any value of a multiplier in the range 1 to 2 as the weight cited above for the dynamic range DR1$a$ serving as the multiplicand in Eq. (1) for computing the dynamic-range sum DR1 for block type 1. FIG. 8 is a block diagram showing the internal configuration of the raw-data decompression section 32.

As shown in FIG. 8, the raw-data decompression section 32 employs a data, latch block 201, selectors 202 to 204, an address counter 205, an inverse quantization block 206, an adder 207 and an inverse polygonal-line conversion/compression block 208.

The data latch block 201 latches 64-bit compressed image data, read out from the SDRAM 14 as data of a block. The data latch block 201 determines the block type determined for the block from the 2-bit identification code at the beginning of the compressed image data. Then, on the basis of the block type obtained as a result of the determination, the data latch block 201 determines locations in the compressed image data as the locations of a minimum value, a shift quantity and quantized data of each pixel, which are included in the compressed image data for every block partial area.

In accordance with a data-length select signal received from the address counter 205, the quantized-data selector 202 sequentially selects quantized data of each of 12 pixels from the quantized data latched in the data latch block 201. The length of the quantized data of each pixel is 3 or 4 bits determined by the data-length select signal. The quantized-data selector 202 outputs the selected quantized data of each of 12 pixels to the inverse quantization block 206.

In accordance with an area select signal received from the address counter 205, the shift-quantity selector 203 selects a shift quantity for block partial area A or B from the quantized data latched in the data latch block 201 and outputs the selected shift quantity to the inverse quantization block 206.

In accordance with the same area select signal received from the address counter 205 as the area select signal supplied to the shift-quantity selector 203, the minimum-value selector 204 selects a minimum value of data of pixels in block partial area A or B from the quantized data latched in the data latch block 201 and outputs the selected minimum value to the adder 207.

The address counter 205 starts its operation typically based on counting when the operation to latch quantized data in the data latch block 201 is completed. The address counter 205 properly sets the data-length select signal output to the quantized-data selector 202 to indicate whether the length of quantized data of each pixel (that is, the length of the quantized word) is 4 bits for block type 1 or 3 bits for block types 2 to 4. The address counter 205 properly sets the area select signal output to the shift-quantity selector 203 to request the shift-quantity selector 203 to select the shift quantity for block partial area A or B. The select signal output to the shift-quantity selector 203 is also output to the minimum-value selector 204. The address counter 205 properly sets the select signal output to the minimum-value selector 204 to request the minimum-value selector 204 to select the shift quantity for block partial area A or B.

The address counter 205 properly sets the select signals in accordance with an identification code read out from the data latch block 201 as a code representing the proper block type. To be more specific, if the identification code indicates block type 1, the address counter 205 properly sets the quantized-data select signal output to the quantized-data selector 202 to request quantized-data selector 202 to sequentially read out quantized data of 12 pixels in area A1 and indicate that the length of the quantized data for each pixel is 4 bits. In addition, the address counter 205 properly sets the area select signals output to the shift-quantity selector 203 and the minimum-value selector 204 to request the shift-quantity selector 203 and the minimum-value selector 204 to select respectively the shift quantity and the minimum value for area A1 or block partial area A shown in FIG. 8.

If the identification code indicates block types 2 to 4, the address counter 205 properly sets the quantized-data select signal output to the quantized-data selector 202 to request the quantized-data selector 202 to sequentially read out quantized data of 12 pixels in areas A (corresponding one of areas A2, A3 and A4) as well as B (corresponding one of areas B2, B3 and B4) and indicate that the length of the quantized data for each pixel is 3 bits. In addition, the address counter 205 properly sets the area select signals output to the shift-quantity selector 203 and the minimum-value selector 204 to request the shift-quantity selector 203 and the minimum-value selector 204 to select respectively the shift quantity and the minimum value for area partial area A shown in FIG. 8. After the process to output the shift quantity and the minimum value for area A from the data latch block 201 has been completed, the address counter 205 changes the area select signals output to the shift-quantity selector 203 and the minimum-value selector 204 to request the shift-quantity selector 203 and the minimum-value selector 204 to select respectively the shift quantity and the minimum value for block partial area B shown in FIG. 8 this time.

Thus, the timing to change the area, select signals output to the shift-quantity selector 203 and the minimum-value selector 204 needs to be varied in accordance with whether the block type is block type 2, 3 or 4.

The inverse quantization block 206 carries out an inverse quantization process based on a shift quantity received from the shift-quantity selector 203 on quantized data received from the quantized-data selector 202. The inverse quantization block 206 is typically configured to function as a left-direction bit shifter for shifting the quantized data, received from the quantized-data selector 202 as the 3-bit or 4-bit quantized data of each of 12 pixels in a direction to the left toward the most significant bit of the 3-bit or 4-bit quantized data by as many hits as indicated by the shift quantity received from the shift-quantity selector 203. Thus, the inverse quantization block 206 inserts as many bits as indicated by the shift quantity received from the shift-quantity selector 203 to the 3-bit or 4-bit quantized data of each pixel into the right side of the quantized data, reproducing the 10-bit pre-quantization data of each pixel in a block partial area, the shift quantity of which is output by the shift-quantity selector 203.

If the structure of the compressed image data shown in FIG. 6 includes a dynamic range in place of a shift quantity used in tire inverse quantization process as described above, the inverse quantization block 206 can be configured to function as an integer-type multiplier for multiplying the quantized data by the dynamic range in order to reproduce the 10-bit pie-quantization data.

The adder 207 adds the 10-bit minimum value received from the minimum-value selector 204 to the pre-quantization data received from the inverse quantization block 206 in order to reproduce post-conversion data of the pixel. That is to say, the adder 207 adds the DC offset component of a block partial area, to the pre-quantization data of each individual one of pixels pertaining to the area in order to reproduce the 10-bit post-conversion data of the individual pixel.

The inverse polygonal-line conversion/compression block 208 carries out an inverse polygonal-line conversion process on the 10-bit post-conversion data received from the adder 207 in order to reproduce the 14-bit original raw image data on the basis of an inverse input/output characteristic, which is obtained by reversing the input/output characteristic of the polygonal-line conversion/compression block 101 employed in the raw-data compression section 31 shown in FIG. 4. That is to say, the inverse polygonal-line conversion/compression block 208 decompresses the 10-bit post-conversion data into tire 14-bit original raw image data as follows.

Figure 9:
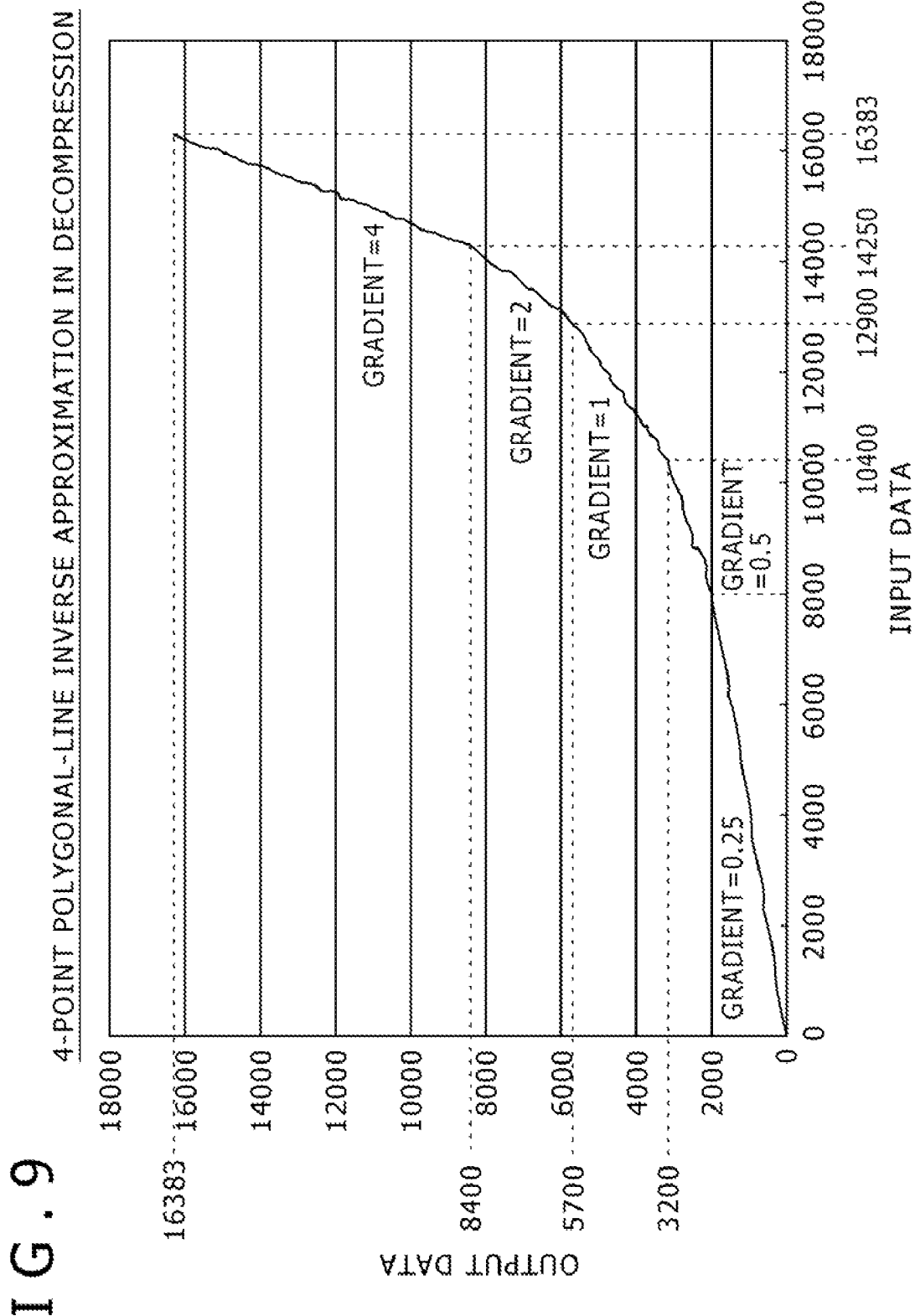
FIG. 9 is a diagram showing a typical polygonal line used in an inverse polygonal-line conversion/decompression block.

FIG. 9 is a diagram showing a typical polygonal line used in the inverse polygonal-line conversion/compression block 208.

The polygonal line shown in FIG. 9 is divided at four points into five straight-line segments having gradients different from each other. The polygonal line is used in a typical process to convert the gradation of the input data into a gradation assigned to output data. The input/output characteristic of the polygonal line shown in FIG. 9 is the inverse of the input/output characteristic of the polygonal line shown in FIG. 5 as a polygonal line used by the polygonal-line conversion/compression block 101. First of ail, the inverse polygonal-line conversion/compression block 208 decompresses the 10-bit post-conversion data into the 14-bit pre-conversion data by shilling the 10-bit post-con version data in a direction to the left toward the most significant bit of the 10-bit post-conversion data by 4 bits. Then, the inverse polygonal-line conversion/compression block 208 carries out the gradation conversion process based on the polygonal line shown in FIG. 9 on the 14-bit pre-conversion data in order to generate the 14-bit original raw image data.

It is to be noted that each of the polygonal lines shown in FIGS. 5 and 9 is typically implemented as a ROM table stored in advance in a ROM as a table associating input data prior to the gradation conversion process with output data obtained as a result of the gradation conversion process. That is to say, each of the polygonal-line conversion/compression block 101 employed in the raw-data compression section 31 shown in FIG. 4 and the inverse polygonal-line conversion/compression block 208 employed in the raw-data decompression section 32 shown in FIG. 8 converts the gradation of the input data received prior to the gradation conversion process into the gradation of the output data obtained as a result of the gradation conversion process by making use of the ROM table. If the polygonal-line conversion/compression block 101 does not carry out the optional gradient conversion process and tire optional compression process, the decompression and gradient-conversion processes to be carried out by the inverse polygonal-line conversion/compression block 208 is also omitted by bypassing the inverse polygonal-line conversion/compression block 208.

In accordance with the compression method adopted by the raw-data compression section 31, prior to the compression process, each block composed of a fixed number of same color component pixels adjacent to each other has been split into two quantization-subject areas each composed of one or more pixels adjacent to each other, in addition, a plurality of block types have been defined in advance for the block so that the block types can be distinguished from each other by the position of the inter-area boundary between the two quantization-subject areas in the block. Thus, the block type of a block represents a pattern of dividing the block into the two quantization-subject areas. The raw-data compression section 31 compresses image data by taking the block as a unit of compression in order to generate compressed image data as follows. The DR computation unit 131 computes a dynamic range of the data of all pixels in each of the two quantization-subject areas in tire block. The DR addition unit 132 computes a sum of aforementioned dynamic ranges each found for a block partial area, for each of the block types defined for the block. Then, the DR-sum comparison unit 133 compares the dynamic-range sums each computed for one of the block types with each other and selects the block type having a smallest sum as a proper block type for the block. The quantization block 109 carries out a quantization process for each of quantization-subject areas composing the block in accordance with the proper block type selected for the block. That is to say, the quantization block 109 carries out a quantization process on pixels included in each of quantization-subject areas each having a unique dynamic range. In other words, the quantization block 109 carries out a quantization process on pixels included in every individual one of the quantization-subject areas on the basis of the same dynamic range unique to the individual area. Thus, the quantization block 109 carries out a quantization process on pixels included in a quantization-subject area in accordance with the state of the area in order to suppress as many noises as possible.

The raw-data decompression section 32 carries out inverse processing opposite to the processing carried out by the raw-data compression section 31. Thus, it is possible to implement a compression process that can be carried out at a high compression ratio in order to produce image data having few deteriorations of the image quality even though the compression process is a reversible compression process and implement a decompression process opposite to the compression process in spite of the reversibility of tire compression process. If a block includes a portion such as an edge at which brightness variations are severe in particular, the block is divided into quantization-subject areas separated by air inter-area boundary coinciding with the edge. Then, by earning out a quantization process on each of the quantization-subject areas, the quantization process will result in few deteriorations of the image quality in comparison with a single quantization process carried out on the whole block.

For example, under a variety of conditions according to the embodiment described above, raw image data of each of 12 pixels in a block is quantized into pixel data having a quantized-word length of 3 or 4 bits depending on the selected block type. In this case, a compression rate of about 38% can be obtained. In addition, if the image is an ordinary natural image, the PSNR (peak signal to noise ratio) can be sustained at a value of about 44.6 dB at a point of time the image signal has been converted into an 8-bit luminance signal Y and 8-bit color-difference signals R-Y and B-Y after compression and decompression. Thus, the compression technique results in compression distortion which has such a small amount that the compression distortion cannot be detected by the naked eye at a point of time the image signal has been converted into a luminance signal Y and color-difference signals R-Y and B-Y. As a result, the deteriorations of the image quality can all but eliminated.

In addition, by adopting the data compression technique described above, raw image data of each of 12 pixels in a block can be compressed into encoded pixel data having a fixed length of the quantized word. Thus, the band of data to be stored into the SDRAM 14 and data read out from the SDRAM 14 by way of the internal bus 28 can be reduced to a level determined in advance. Accordingly, addresses in tire SDRAM 14 can be managed with ease. As a result, it is possible to implement an imaging apparatus capable of earning out processing at a high speed even though the apparatus has a reduced circuit size and a decreased manufacturing cost.

In addition, the compression ratio is determined by the combination of the number of pixels in each block and the length of the quantized word. Thus, there is still room for flexibility in considering a combination of factors such as the level of the necessary quality of the image, the allocation of the internal bus 28 to transfers of data to and from the SDRAM 14 as well as tire performance of the operations to store data into the SDRAM 14 and read out data from the SDRAM 14. The quality of an image can be interpreted as an indicator as to how many unallowable distortions are included in the image. As a result, it is possible to reduce the cost to develop imaging apparatus having specifications different from each other.

In the embodiment described above, each block is composed of adjacent pixels arranged along two lines. It is to be noted, however, that the scope is by no means limited to this embodiment. For example, each block may also be composed of adjacent pixels arranged along only one line or at least three lines. In addition, in the embodiment described above, block partial areas in each block are defined by separating the areas from each other by a vertical inter-area boundary line. It is to be noted, however, that tire scope is by no means limited to this embodiment. For example, block partial areas in each block can also be defined by separating the areas from each other by a horizontal or inclined inter-area boundary line.

By using a horizontal inter-area boundary line, however, when data of pixels on several lines composing a block is received, tire compression processing can be carried out on the pixel data as sequential processes starting from the beginning of each of the lines. Thus, the circuit configuration and the processing control can be made simple so that the processing efficiency can be improved. Such a configuration can be conceivably applied to, for example, an imaging sensor having multi-channel specifications specifying an imaging sensor capable of simultaneously outputting pixel signals each having the same color components on a plurality of lines.

In addition, if each block is rectangular as is the case of the embodiment described above, it is possible to provide a particular configuration in which the raw-data compression section 31 and the camera-signal pre-processing section 21 are integrated to form a single body. For example, the defective-pixel correction function of the camera-signal pre-processing section 21 is executed for finding the data of a defective pixel of interest by interpolation based on data of pixels surrounding the defective pixel. In addition, in some configurations, the camera-signal pre-processing section 21 is provided with an isolated-pixel exclusion function for correcting a signal of an isolated pixel having a data level very; much different from a data level inferred from pixels surrounding the isolated pixel. In order to execute the defective-pixel correction function and/or the isolated-pixel exclusion function, a line memory is needed for storing data of the surrounding pixels. Thus, the defective-pixel correction function and/or the isolated-pixel exclusion function exhibit a great affinity for the function of the compression processing carried out by the raw-data compression section 31 by handling pixels on a plurality of lines as a unit. Accordingly, by making use of a line memory common to the defective-pixel correction function, the isolated-pixel exclusion function and the function of the compression processing, the function of the raw-data compression section 31 or portions of the function can be carried out in the camera-signal pre-processing section 21.

In addition, in the embodiment described above, for each block type associated with the position of the inter-area boundary between two block partial areas in a block, the quantization process is carried out to result in quantized data having the same quantized-word length for the two areas. If a particular one of the two block partial areas has more pixels that the other area as is the case with the block partial areas conforming to block types 2 to 4 described so far, for example, it is also possible to provide a configuration in which tire particular area has a greater quantized-word length than the other.

In addition, by changing the setting of the quantized-word length, the raw-data compression section 31 in the configuration described above can be made capable of carrying out a variable-length encoding process whereas the raw-data decompression section 32 can be made capable of carrying out a variable-length decoding process. For example, a variable-length encoding process can be carried out at a high compression efficiency by changing the length of the quantized word adaptively to the dynamic range. On top of that, by carrying out a reversible compression process adopting the techniques described above, deteriorations of the image quality can be completely avoided. In tins case, however, the compression and decompression processes based on a polygonal line are not carried out.

In addition, it is also possible to provide a configuration in which the CPU 25 adaptively controls the states of setting in the raw-data compression section 31 and the raw-data decompression section 32. For example, the CPU 25 is made capable of changing the compression ratio by executing control such as tire control to turn on and off the polygonal-line compression and decompression functions which are capable of varying the length of the quantized word, the number of pixels included in each block and the proper block type. On top of that, it is also possible to provide a configuration in which the functions of the raw-data compression section 31 and the raw-data decompression section 32 can be disabled and enabled. For example, in a mode for turning on the compression and decompression locations only during a continuous imaging operation and for recording raw image data onto the storage device 16 as it is, control can be executed typically to turn off the compression and decompression functions.

In addition, instead of providing the raw-data compression section 31 and tire raw-data decompression section 32 at the locations described above, it is also possible to provide a configuration in which the raw-data compression section 31 and the raw-data decompression section 32 are provided at locations for example between the internal bus 28 and the SDRAM controller 27. Even such a configuration is capable of giving an effect of shortening tire time it takes to read out raw image data from the SDRAM 14 and write data into the SDRAM 14 as well as an effect of making the storage capacity of the SDRAM 14 smaller.

Second Embodiment

Figure 10:
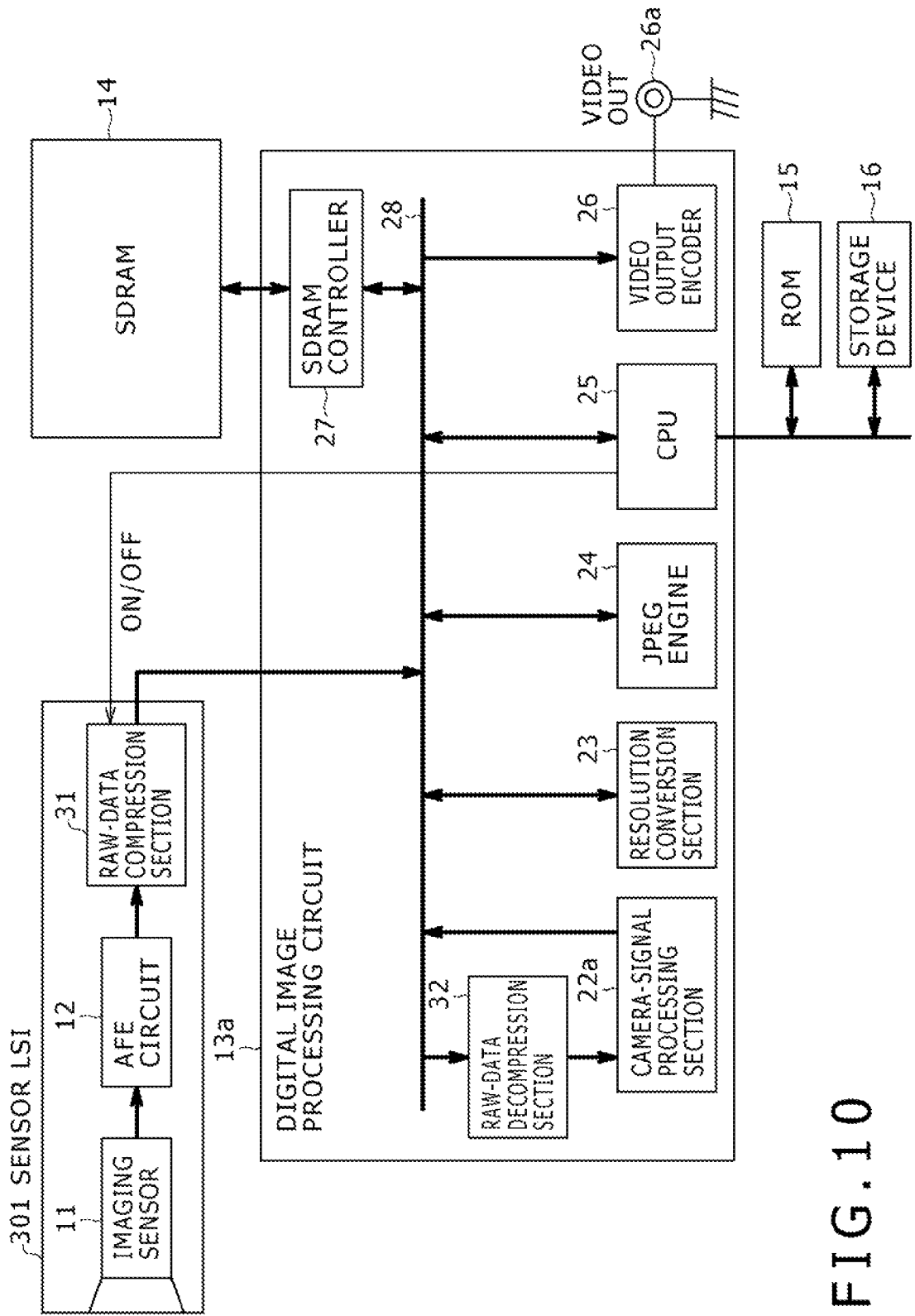
FIG. 10 is a block diagram showing the configuration of an imaging apparatus according to a second embodiment.

FIG. 10 is a block diagram showing an outline of the configuration of an imaging apparatus according to a second embodiment. It is to be noted that configuration components shown in FIG. 10 as components identical with their respective counterparts employed in the configuration shown in FIG. 1 are denoted by the same reference numerals as the counterparts and the explanation of the identical components is omitted in order to avoid duplications of descriptions.

In the imaging apparatus shown in FIG. 10, an imaging sensor 11 and an AFE circuit 12 including the sample/hold and analog/digital conversion functions are created on a single sensor LSI (large scale integration) circuit 301 which also contains a raw-data compression section 31. It is to be noted that a camera-signal processing section 22a employed in the imaging apparatus shown in FIG. 10 has the function of the camera-signal processing section 22 employed in the configuration shown in FIG. 1 as well as the function of the camera-signal pre-processing section 21 also employed in the configuration shown in FIG. 1.

By providing such a configuration, it is possible to give an effect of reducing the processing load to read out raw image data from the SDRAM 14 and write data into the SDRAM 14 as described above and an effect of reducing the band of data, transfers through an internal bus 28 in a digital image processing circuit 13a. In addition, it is also possible to give an effect of lowering the frequency of data transfers from the sensor LSI circuit 301 to tire digital image processing circuit 13a and, hence, an effect of reducing the power consumption. On top of that, the number of radiations originated from the sensor LSI circuit 301 as radiations from a bus to the digital image processing circuit 13a can be decreased and an effect on typically signals in the sensor LSI circuit 301 can also be suppressed. In addition, tire thickness of a sheet material for avoiding such radiations can be reduced or the sheet material itself can be eliminated to give an effect of decreasing the thickness and size of the imaging apparatus.

On top of that, in the embodiment shown in FIG. 10, a CPU 25 employed in the digital image processing circuit 13a is capable of executing control to turn on and off the function of the raw-data compression section 31 employed in the sensor LSI circuit 301. In this embodiment, the CPU 25 employed in the digital image processing circuit 13a is also capable of executing control to turn on and off the function of the raw-data decompression section 32 also employed in the digital image processing circuit 13a through the internal bus 28. By providing such a configuration, in a mode for turning on the compression and decompression functions only during a continuous imaging operation and for recording raw image data onto the storage device 16 as it is, control can be executed typically to turn off the compression and decompression functions, making it possible to implement operations according to setting.

In addition, the CPU 25 is capable of executing not only the control to turn on and off the functions of the raw-data compression section 31 and the raw-data decompression section 32, but also proper control to change the setting of the raw-data compression section 31.

Third Embodiment

Figure 11:
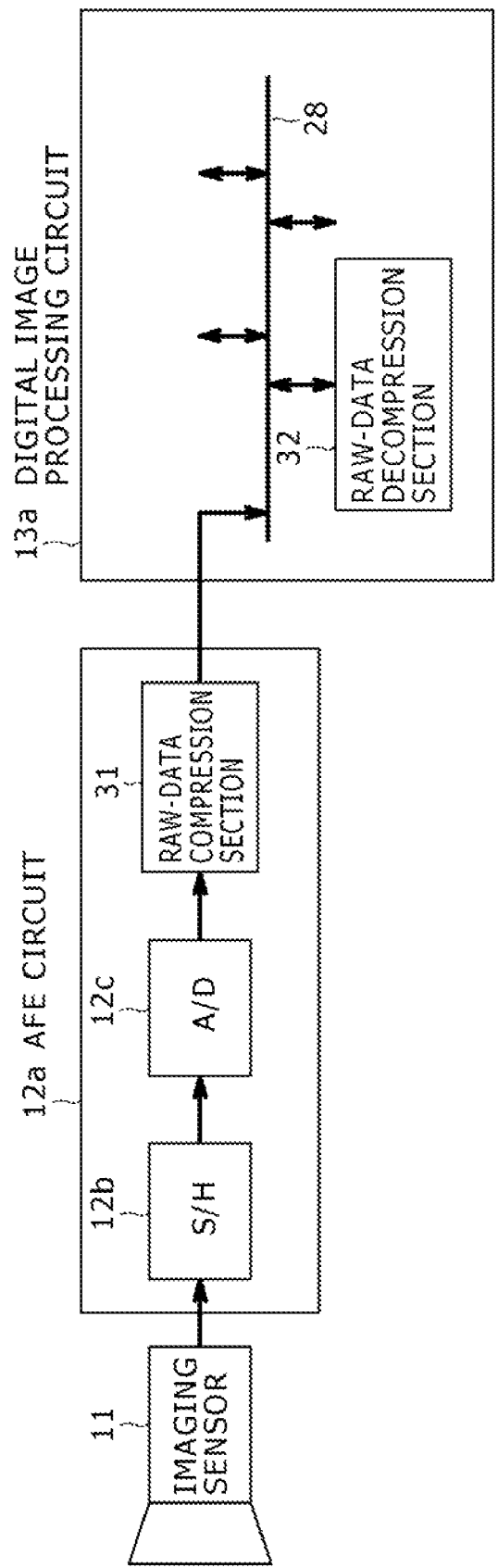
FIG. 11 is a block diagram showing the configuration of an imaging apparatus according to a third embodiment.
Figure 12:
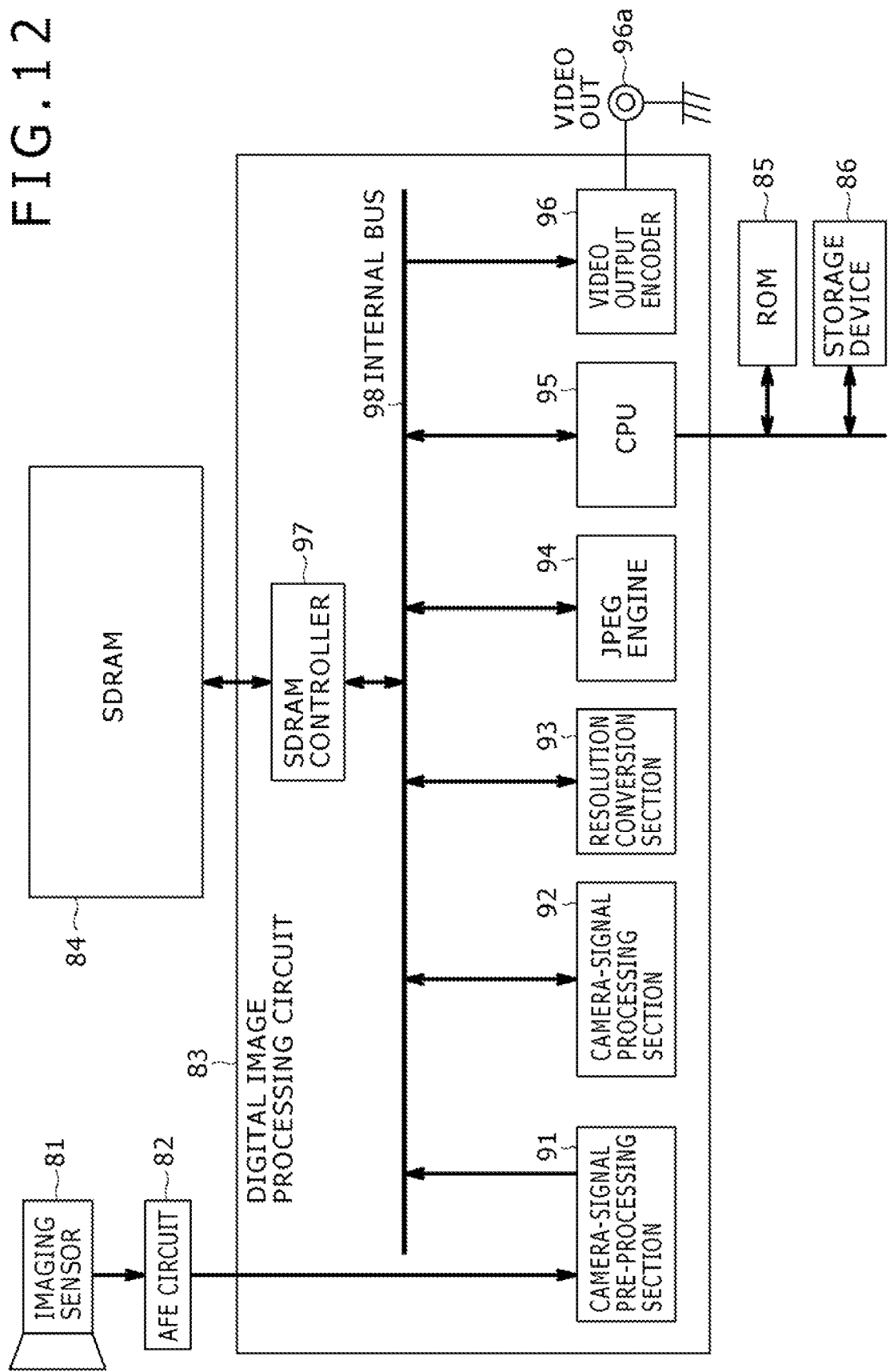
FIG. 12 is a block diagram showing the configuration of the imaging apparatus in related art.

FIG. 11 is a block diagram showing an outline of the configuration of an imaging apparatus according to a third embodiment. It is to be noted that configuration components shown in FIG. 11 as components identical with their respective counterparts employed in the configuration shown in FIG. 1 are denoted by the same reference numerals as the counterparts and the explanation of the identical components is omitted in order to avoid duplications of descriptions.

In the imaging apparatus shown in FIG. 11, an AFE circuit 12a is a single chip including a sample/hold section 12b for carrying out the CDS process, an A/D conversion section 12c and a raw-data compression section 31. It is to be noted that, much like the camera-signal processing section 22a employed in the imaging apparatus shown in FIG. 10, a camera-signal processing section employed in the imaging apparatus shown in FIG. 11 which does not show the camera-signal processing section itself also has the function of the camera-signal processing section 22 employed in the configuration shown in FIG. 1 as well as the function of the camera-signal pre-processing section 21 also employed in the configuration shown in FIG. 1.

Much like the imaging apparatus shown in FIG. 10, by providing such a configuration, it is possible to give an effect of reducing the processing load to read out raw image data from the SDRAM 14 and write data into the SDRAM 14 as described above as well as an effect of reducing the band of data transfers through an internal bus 28 in a digital image processing circuit 13a. In addition, it is also possible to give an effect of lowering the frequency of data transfers from the AFE circuit 12a to the digital image processing circuit 13a and, hence, an effect of reducing the power consumption. On top of that, the number of radiations described above can be decreased.

It is to be noted that, much like the imaging apparatus shown in FIG. 10, also in the case of this embodiment, a CPU employed in the digital image processing circuit 13a of the imaging apparatus shown in FIG. 11 which does not show the CPU itself can also be made capable of executing control to turn on and off the fun en on of the raw-data compression section 31 employed in the AFE circuit 12a. In addition, the CPU 25 can also be made capable of executing not only the control to turn on and off the functions of the raw-data, compression section 31, but also proper control to change the setting of the raw-data compression section 31.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An imaging apparatus for taking an image by making use of a solid-state imaging sensor, said imaging apparatus comprising:
   a compression section configured to compress image data, which is generated by said solid-state imaging sensor as a result of an imaging process, by dividing said image data into blocks each composed of a fixed number of same color component pixels adjacent to each other and taking each of said blocks as a unit of compression;
   a memory used for temporarily storing compressed image data produced by said compression section;
   a decompression section configured to decompress said compressed image data read out from said memory; and
   a signal processing section configured to carry out an image-quality correction process on decompressed image data produced by said decompression section,
   wherein each of said blocks is split in advance into two quantization-subject areas each composed of one or more pixels adjacent to each other,
   a plurality of block types are defined in advance for each of said blocks,
   said block types defined for any individual one of said blocks are distinguished from each other by the position of the inter-area boundary between said two quantization-subject areas in said individual block, and
   said compression section has
      a dynamic-range computation sub-section configured to compute a dynamic range of pixel data, of pixels in each of said quantization-subject areas for each of said quantization-subject areas in each of said blocks,
      a block-type select sub-section configured to compute a sum of said dynamic ranges, which are each computed by said dynamic-range computation sub-section for one of said quantization-subject areas in any individual one of said blocks, for each of said block types defined for said individual block on the assumption that each of said block types has been selected for said individual block and select said block type having a smallest sum of said dynamic ranges among all said block types defined for said individual block as a proper block type for said individual block, and
      a quantization processing sub-section configured to quantize a difference, which is obtained as a result of subtracting the smallest pixel data among all pixels in any individual one of said quantization-subject areas from the pixel data of each of said pixels in said individual quantization-subject area, in accordance with said dynamic range, which is computed by said dynamic-range computation sub-section for said individual quantization-subject area, for every pixel in said quantization-subject areas which are included in any individual one of said blocks as quantization-subject areas having an inter-area boundary conforming to said proper block type selected by said block-type select sub-section for said individual block.

2. The imaging apparatus according to claim 1 wherein said compressed image data produced by said compression section for any individual one of said blocks includes:
   pattern identification information used for identifying said proper block type selected by said block-type select sub-section for said individual block;
   dynamic-range information on said dynamic ranges each computed by said dynamic-range computation sub-section for one of said quantization-subject areas included in said individual block as quantization-subject areas having an inter-area boundary conforming to said proper block type;
   minimum information showing minimum values each found as said smallest pixel data among all pixels in each one of said quantization-subject areas included in said individual block; and
   quantized data produced by said quantization processing sub-section for every pixel in said individual block.

3. The imaging apparatus according to claim 2 wherein said quantization processing sub-section quantizes pixel data of pixels in any individual one of said quantization-subject areas included in said individual block as quantization-subject areas having an inter-area boundary conforming to said proper block type selected for said individual block in order to generate quantized pixel data having a quantized-word length set for said proper block type.

4. The imaging apparatus according to claim 2 wherein
said quantization processing sub-section is configured to function as a right-direction bit shifter for shifting pixel data, of every pixel in a direction to the right, toward the least significant bit of said pixel data by as many bits as indicated by said dynamic range computed by said dynamic-range computation sub-section for said quantization-subject area including said pixel on the assumption that the number of quantization steps included in a quantization process carried out by said quantization processing sub-section is a power of 2, and
said dynamic-range information included in said compressed image data produced by said compression section as information on said dynamic ranges each computed by said dynamic-range computation sub-section for one of said two respective quantization-subject areas in said individual block is a shift quantity representing a bit count equal to the number of bits by which said quantization processing sub-section shifts pixel data, of even pixel included in a particular one of said two respective quantization-subject areas in a direction to the right toward the least significant bit of said pixel data and a shift quantity representing a bit count equal to the number of bits by which said quantization processing sub-section shifts pixel data of even pixel included in the other one of said two respective quantization-subject areas in a direction to the eight toward the least significant bit of said pixel data.

5. The imaging apparatus according to claim 4 wherein said decompression section decompresses image data by the steps of:
driving a left-direction bit shifter to carry out an inverse quantization process to shift quantized pixel data of every pixel in any individual one of said quantization-subject areas in a direction to the left toward the most significant bit of said quantized pixel data by as many bits as indicated by a shift, quantity included in said compressed image data produced by said compression section as said shift quantity for said individual quantization-subject area; and
adding a minimum value included in said compressed image data produced by said compression section as said minimum value of pixel data of all pixels in any individual one of said quantization-subject areas to pixel data obtained as a result of said inverse quantization process carried out on every pixel in said individual quantization-subject area.

6. The imaging apparatus according to claim 1 wherein each of said blocks includes pixel data of pixels existing in a rectangular area in said image taken by making use of said solid-state imaging sensor.

7. The imaging apparatus according to claim 6 wherein, for all said block types, said two quantization-subject areas in each of said blocks are separated from each other by a vertical inter-area boundary line.

8. The imaging apparatus according to claim 1 wherein:
said defined block types are a first block type representing a category of said blocks each split into two quantization-subject areas and a second block type representing a category of said blocks each handled entirely as a single quantization-subject area; and
said block-type select sub-section normalizes said sum of said dynamic ranges each computed for one of said quantization-subject areas included in any particular one of said blocks on the assumption that said first block type has been selected as said proper block type for said particular block, normalizes said dynamic range computed for said single quantization-subject area included in said particular block on the assumption that said second block type has been selected as said proper block type for said particular block and compares said normalized sum of said dynamic ranges with said normalized dynamic range in order to select one of said first and second block types as said proper block type having the smaller one of said normalized sum of said dynamic ranges and said normalized dynamic range for said particular block.

9. The imaging apparatus according to claim 8 wherein, instead of comparing said normalized sum of said dynamic ranges for said first block type with said normalized dynamic range for said second block type, said block-type select sub-section compares said normalized sum with a value smaller than said normalized dynamic range.

10. The imaging apparatus according to claim 9 wherein said quantization processing sub-section sets a quantized-word length of pixel data of every pixel in said quantization-subject areas in a quantization process based on said second block type selected by said block-type select sub-section as said proper block type for said block including said quantization-subject areas at a value greater than the quantized-word length of pixel data of every pixel in said quantization-subject areas in a quantization process based on said first block type selected by said block-type select sub-section as said proper block type for said block including said quantization-subject areas.

11. The imaging apparatus according to claim 9 wherein said block-type select sub-section selects one of said first and second block types as said proper block type having said smaller one of said normalized sum of said dynamic ranges and said value smaller than said normalized dynamic range for said particular block as evidenced by a result of comparing said normalized sum of said dynamic ranges with said value smaller than said normalized dynamic range.

12. The imaging apparatus according to claim 11 wherein:
each of said blocks includes pixel data of 12 pixels, that is 6 pixels per line×2 lines, in a rectangular area in said image taken by making use of a solid-state imaging sensor;
said first block type is defined to cover
a block type representing said blocks each including a first quantization-subject area placed at the beginning of said block as a quantization-subject area having 4 pixels, that is 2 pixels per line×2 lines, and a second quantization-subject area placed at a location following said first quantization-subject area as a quantization-subject area having 8 pixels, that is 4 pixels per line×2 lines,
a block type representing said blocks each including a first quantization-subject area placed at the beginning of said block as a quantization-subject area having 8 pixels, that is 4 pixels per line×2 lines, and a second quantization-subject area placed at a location following said first quantization-subject area as a quantization-subject area having 4 pixels, that is 2 pixels per line×2 lines, and
a block type representing said blocks each including a first quantization-subject area placed at the beginning of said block as a quantization-subject area having 6 pixels, that is 3 pixels per line×2 lines, and a second quantization-subject area placed at a location following said first quantization-subject area as a quantization-subject area having 6 pixels, that is 3 pixels per line×2 lines; and if the input data of each pixel has a length of 10 bits, said quantization processing sub-section sets a quantized-word length of pixel data of every pixel in said quantization-subject areas in a quantization process based on said first block type selected by said block-type select sub-section as said proper block type for said block including said quantization-subject areas at 3 bits and a quantized-word length of pixel data of every pixel in said quantization-subject areas in a quantization process based on said second block type selected by said block-type select sub-section as said proper block type for said block including said quantization-subject areas at 4 bits.

13. The imaging apparatus according to claim 1 wherein said dynamic-range computation sub-section computes said dynamic range for any individual one of said quantization-subject areas by finding a difference between the maximum value of pixel data of all pixels in said individual quantization-subject area and the minimum value of pixel data of all pixels in said individual quantization-subject area.

14. The imaging apparatus according to claim 1, said imaging apparatus further comprising;
    a pre-compression section provided at a stage preceding said compression section as a section configured to carry out a pre-compression procedure including a gradation changing process in order to change the gradation of said image taken by making use of said solid-state imaging sensor according to human visual performance characteristics as well as a bit-count reduction process in order to reduce the number of bits included in image data obtained as a result of said gradation changing process and supply image data obtained as a result of said bit-count reduction process to said compression section; and
    a post-decompression section provided at a stage succeeding said decompression section as a section configured to decompress image data output by said decompression section in accordance with a post-decompression procedure set by reversing said pre-compression procedure followed by said pre-compression section.

15. The imaging apparatus according to claim 1 wherein:
    said compression section, said decompression section and said signal processing section are connected to said memory by a common bus;
    after said compressed image data generated by said compression section is stored in said memory through said common bus, said compressed image data is supplied to said compression section through said common bus; and
    decompressed image data, generated by said decompression section is supplied to said signal processing section without transferring said decompressed image data through said common bus.

16. An imaging circuit for taking an image, said imaging circuit having a structure created on a single chip as a structure comprising:
    a solid-state imaging sensor configured to convert incoming light into an electrical imaging analog signal;
    an analog-to-digital conversion circuit configured to convert said electrical imaging analog signal generated by said solid-state imaging sensor into a digital image signal; and
    a compression circuit configured to compress said digital image signal, which is generated by said analog-to-digital conversion circuit, by dividing said digital image signal into blocks each composed of a fixed number of same color component pixels adjacent to each other and taking each of said blocks as a unit of compression,
    wherein each of said blocks is split in advance into two quantization-subject areas each composed of one or more pixels adjacent to each other,
    a plurality of block types are defined in advance for each of said blocks,
    said block types defined for any individual one of said blocks are distinguished from each other by the position of the inter-area boundary between said two quantization-subject areas in said individual block, and
    said compression circuit has
        a dynamic-range computation section configured to compute a dynamic range of pixel data of pixels in each of said quantization-subject areas for each of said quantization-subject areas in each of said blocks,
        a block-type select section configured to compute a sum of said dynamic ranges, which are each computed by said dynamic-range computation section for one of said quantization-subject areas in any individual one of said blocks, for each of said block types defined for said individual block on the assumption that each of said block types has been selected for said individual block and to select said block type having a smallest sum of said dynamic ranges among all said block types defined for said individual block as a proper block type for said individual block, and
        a quantization processing section configured to quantize a difference, which is obtained as a result of subtracting the smallest pixel data among all pixels in any individual one of said quantization-subject areas from the pixel data of each of said pixels in said individual quantization-subject area, in accordance with said dynamic range, which is computed by said dynamic-range computation section for said individual quantization-subject area, for every pixel in said quantization-subject areas which are included in any individual one of said blocks as quantization-subject areas having an inter-area boundary conforming to said proper block type selected by said block-type select section for said individual block.

17. An imaging method for taking an image by making use of a solid-state imaging sensor, said imaging method comprising:
    compressing, performed by a compression section, image data, which is generated by said solid-state imaging sensor as a result of an imaging process, by dividing said image data into blocks each composed of a fixed number of same color component pixels adjacent to each other and by taking each of said blocks as a unit of compression and storing compressed image data obtained as a result of said compression process;
    decompressing, performed by a decompression section, compressed image data read out from said memory; and
    correcting, performed by a signal processing section, image-quality of decompressed image data produced by said decompression section,
    wherein each of said blocks is split in advance into two quantization-subject areas each composed of one or more pixels adjacent to each other,
    a plurality of block types are defined in advance for each of said blocks,
    said block types defined for any individual one of said blocks are distinguished from each other by the position of the inter-area boundary between said two quantization-subject areas in said individual block, and
    said compression step is carried out by executing the steps of computing a dynamic range of pixel data of pixels in each of said quantization-subject areas for each of said quantization-subject areas in each of said blocks, computing a sum of said dynamic ranges, which are each computed at said dynamic-range computation sub-step for one of said quantization-subject areas in any individual one of said blocks, for each of said block types defined for said individual block on the assumption that each of said block types has been selected for said individual block and selecting said block type having a smallest sum of said dynamic ranges among all said block types defined for said individual block as a proper block type for said individual block, and quantizing a difference, which is obtained as a result of subtracting the smallest pixel data among all pixels in any individual one of said quantization-subject areas from the pixel data of each of said pixels in said individual quantization-subject area, in accordance with said dynamic range, which is computed at said dynamic-range computation sub-step for said individual quantization-subject area, for every pixel in said quantization-subject areas which are included in any individual one of said blocks as quantization-subject areas having an inter-area boundary conforming to said proper block type selected at said block-type select sub-step for said individual block.

* * * * *